(12) United States Patent
Patel

(10) Patent No.: US 6,328,374 B1
(45) Date of Patent: Dec. 11, 2001

(54) FULLY-OPENABLE SLIDABLE VEHICLE DOOR ASSEMBLY

(75) Inventor: Rajesh K. Patel, Farmington Hills, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/598,520

(22) Filed: Jun. 21, 2000

(51) Int. Cl.[7] .................................................... B60J 5/06
(52) U.S. Cl. .............................. 296/155; 49/213; 49/214; 49/215; 49/216; 49/360
(58) Field of Search ........................... 296/155; 49/213, 49/214, 215, 216, 360

(56) References Cited

U.S. PATENT DOCUMENTS

| | | |
|---|---|---|
| 372,847 * | 11/1887 | Fallon ................................... 49/213 |
| 3,728,819 | 4/1973 | Goldbach et al. . |
| 4,025,104 | 5/1977 | Grossbach et al. . |
| 4,152,872 * | 5/1979 | Tanizaki et al. ....................... 49/214 |
| 4,495,729 | 1/1985 | Britzke et al. . |
| 4,559,740 * | 12/1985 | Tuchiya et al. ........................ 49/216 |
| 4,611,434 * | 9/1986 | Britzke et al. ..................... 49/214 X |
| 5,906,071 * | 5/1999 | Buchanan, Jr. ........................ 49/360 |
| 5,967,595 * | 10/1999 | Heya et al. ........................... 296/155 |
| 5,992,097 * | 11/1999 | Makiuchi et al. ..................... 49/216 |

FOREIGN PATENT DOCUMENTS

| | | | |
|---|---|---|---|
| 2119209 * | 4/1971 | (DE) .................................... 296/155 |
| 0357542 * | 3/1990 | (EP) ..................................... 296/155 |
| 002248649-A * | 4/1992 | (GB) .................................... 296/155 |
| 0034922 * | 2/1984 | (JP) ..................................... 296/155 |

* cited by examiner

Primary Examiner—Stephen T. Gordon
Assistant Examiner—Lori L. Coletta
(74) Attorney, Agent, or Firm—David B. Kelley

(57) ABSTRACT

A slidable contoured side door of an automotive vehicle equipped with a guidance structure that permits full travel of the door without adversely affecting door stability. The guidance structure may include a carriage movable along a relatively short track at the door lower edge and a stabilizer arm having limited sliding motion relative to the door. The relative sliding motion enables the contoured door to be out of registry with the door opening when the door is in the fully open position. This enables the door opening to be unobstructed so that passengers or cargo can more easily pass through the door opening.

20 Claims, 22 Drawing Sheets

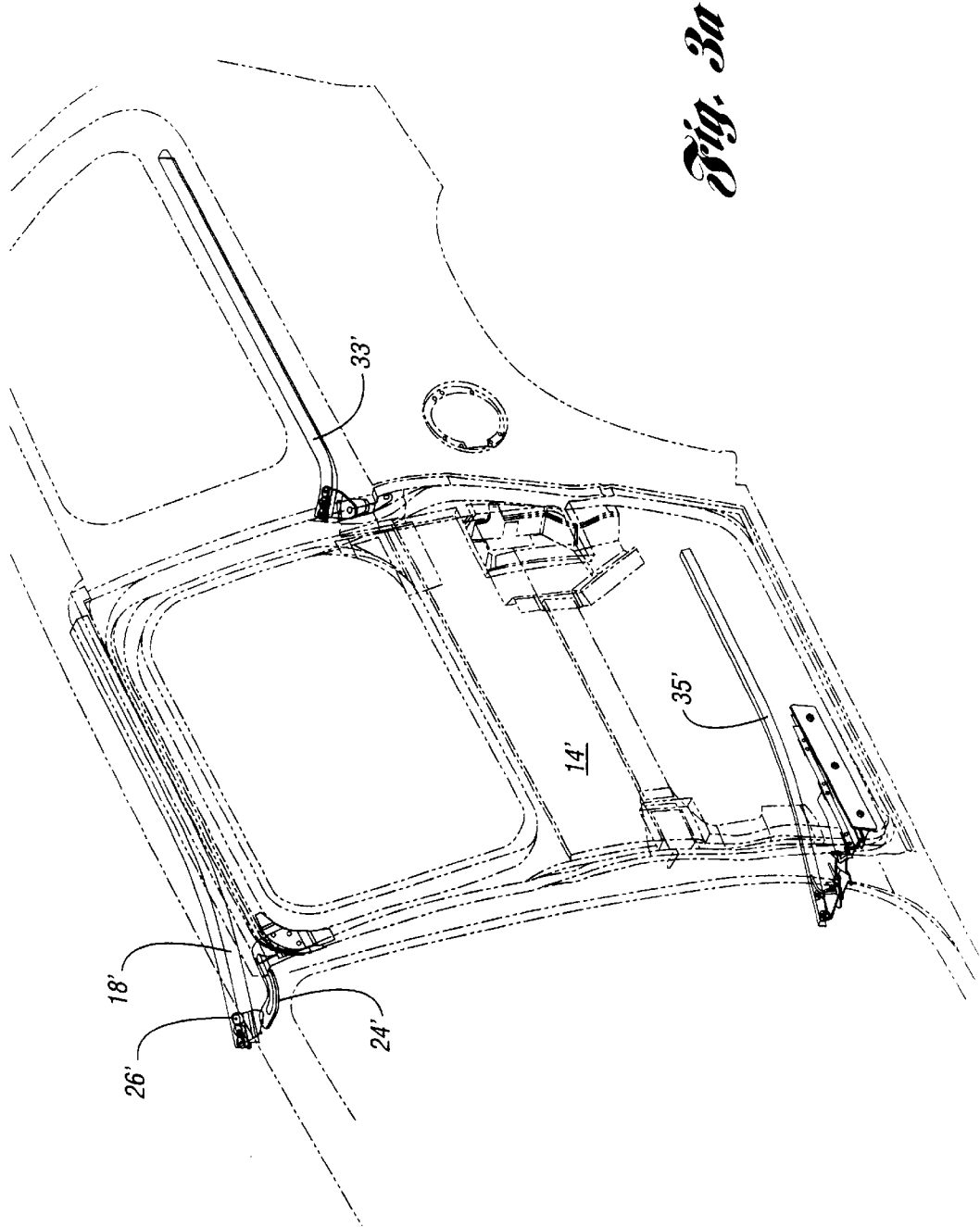

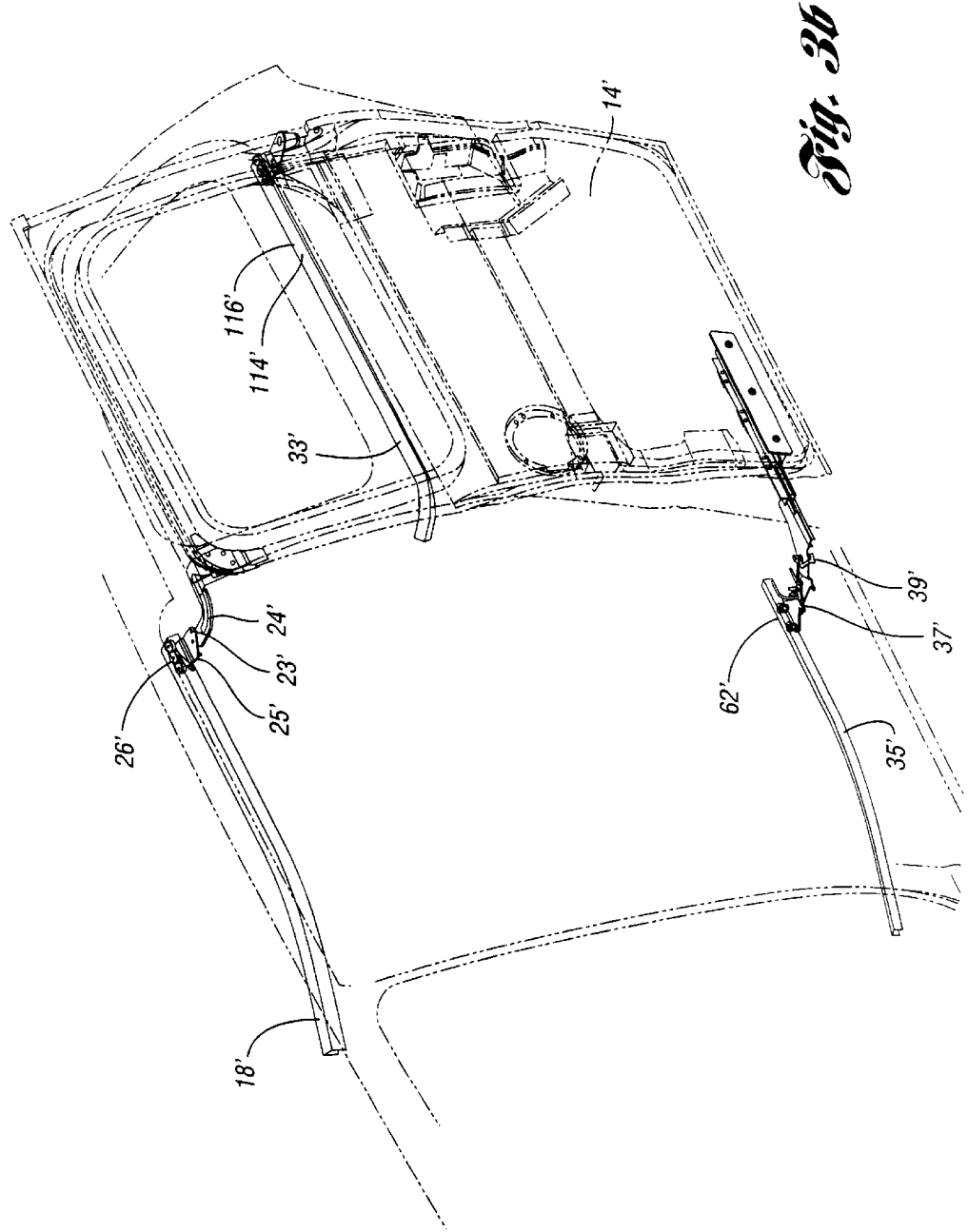

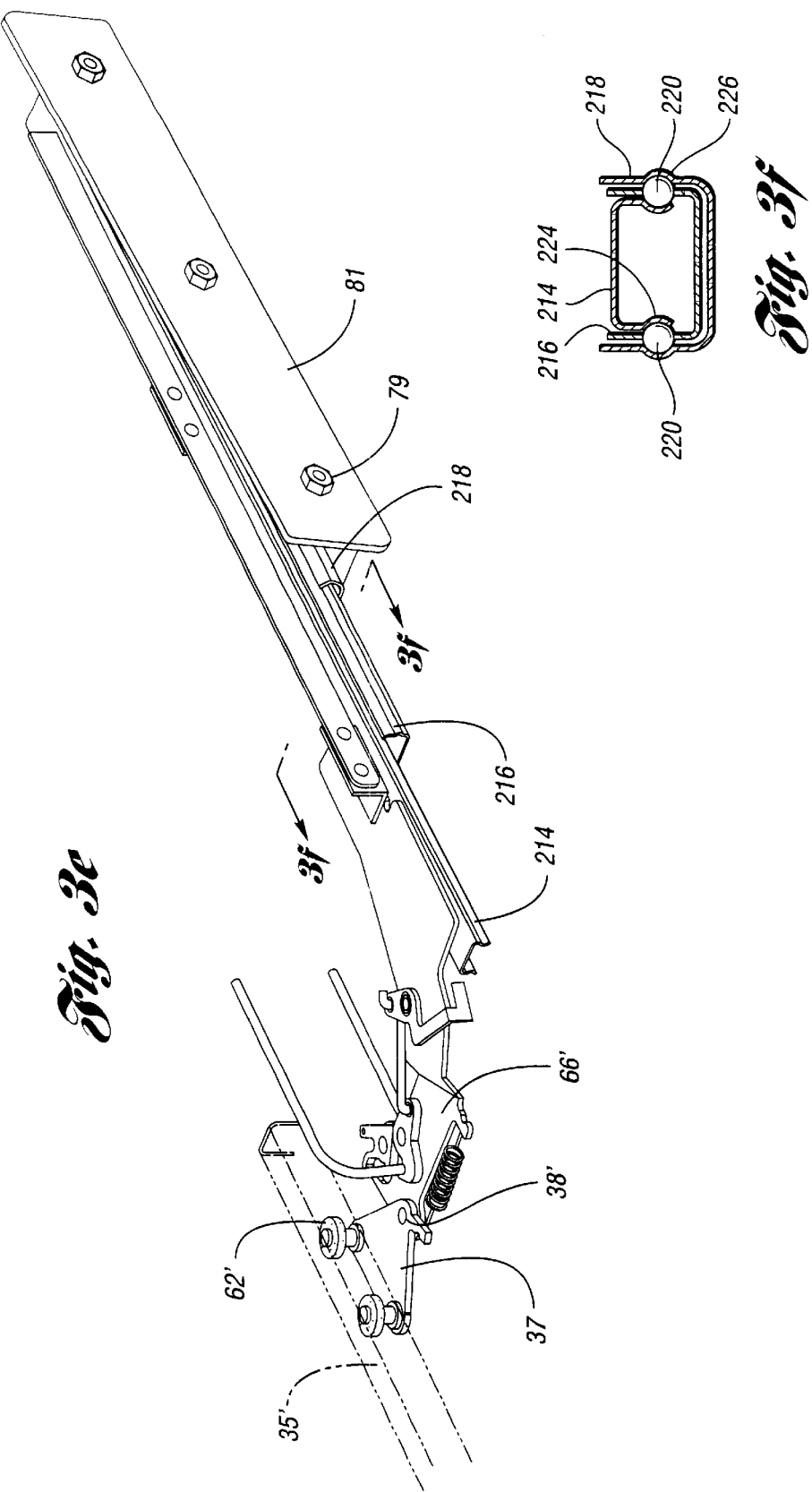

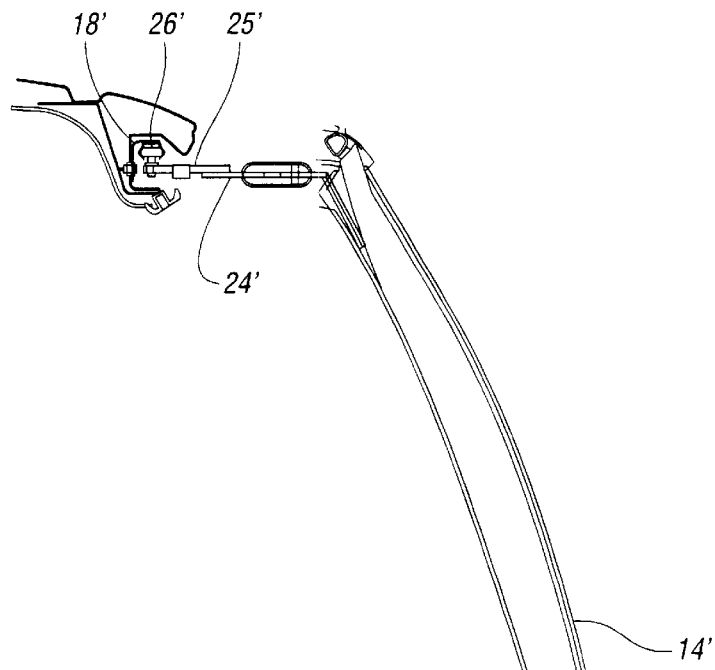
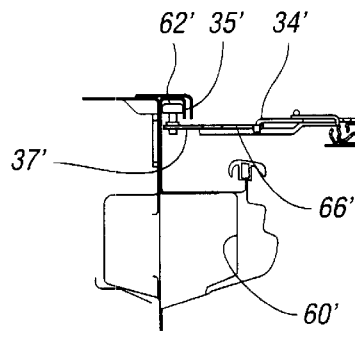
Fig. 4

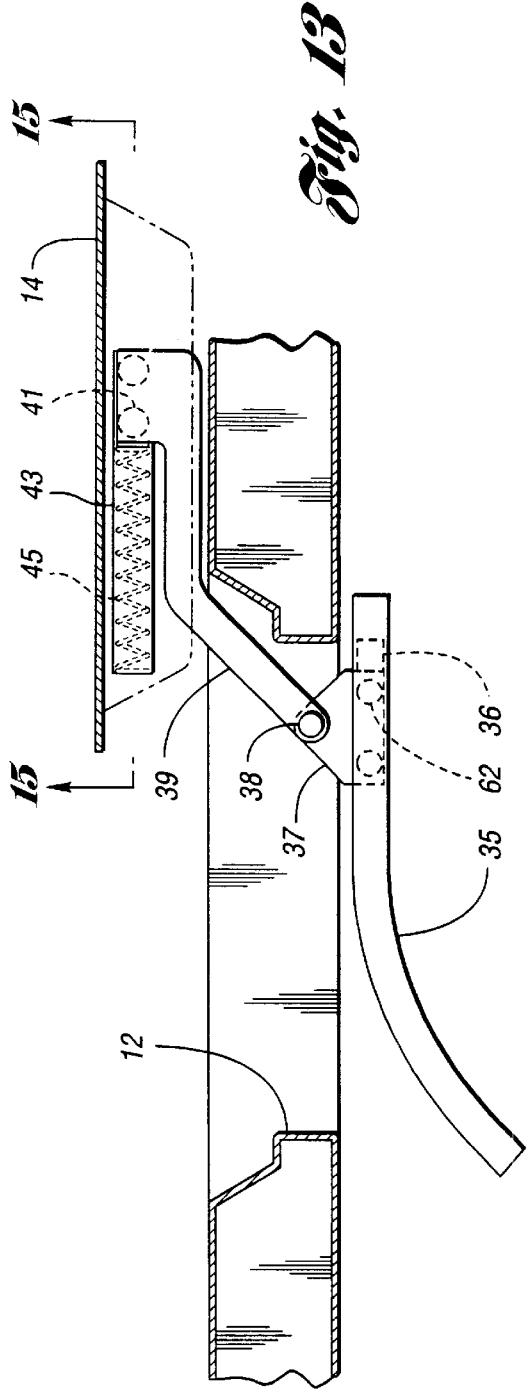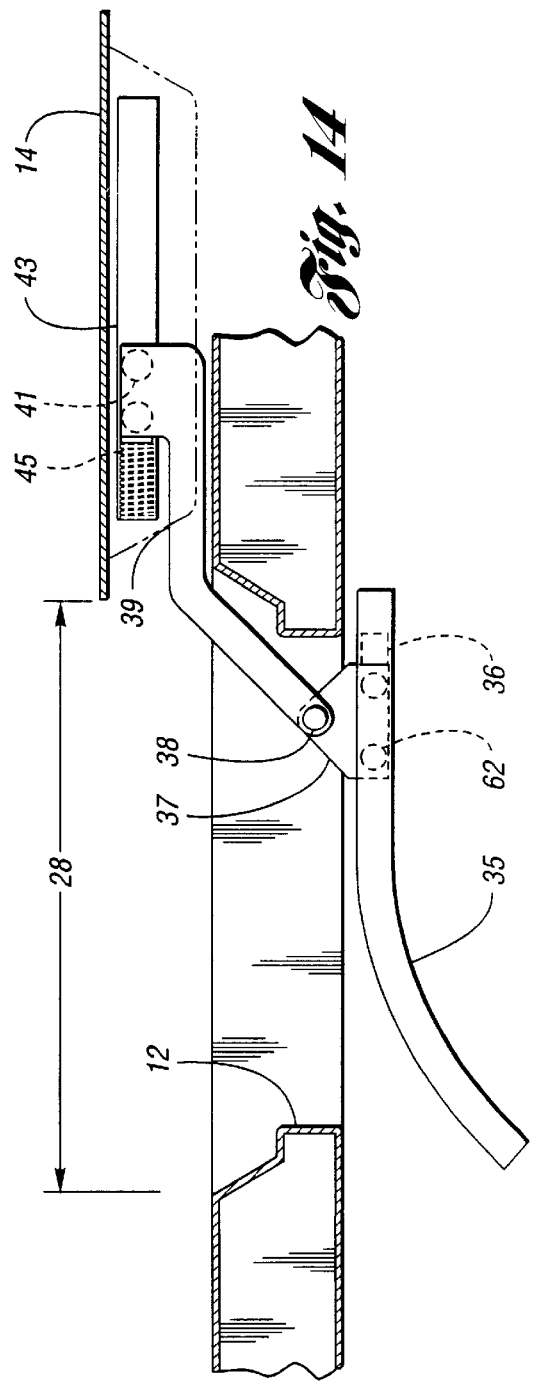

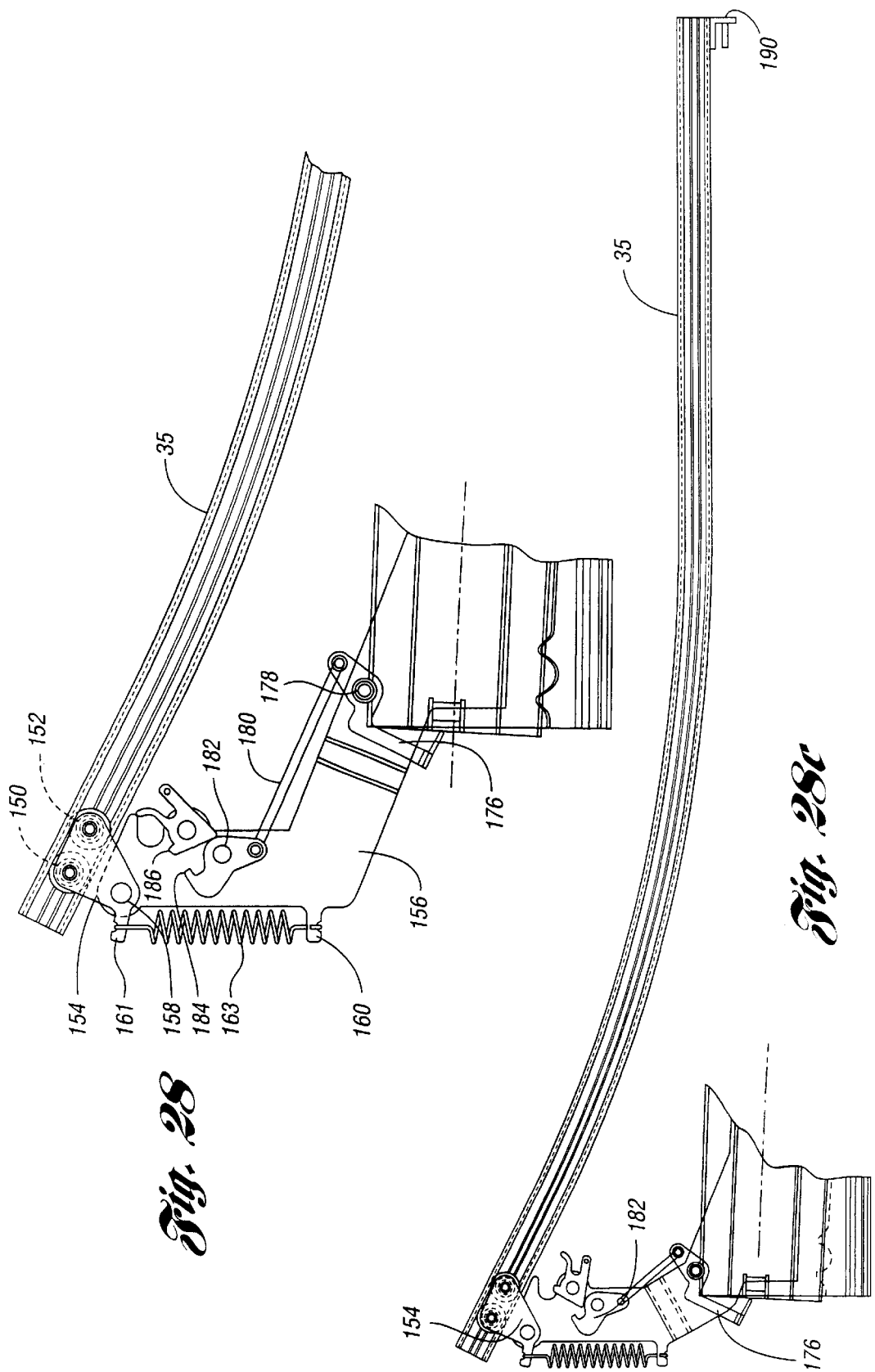

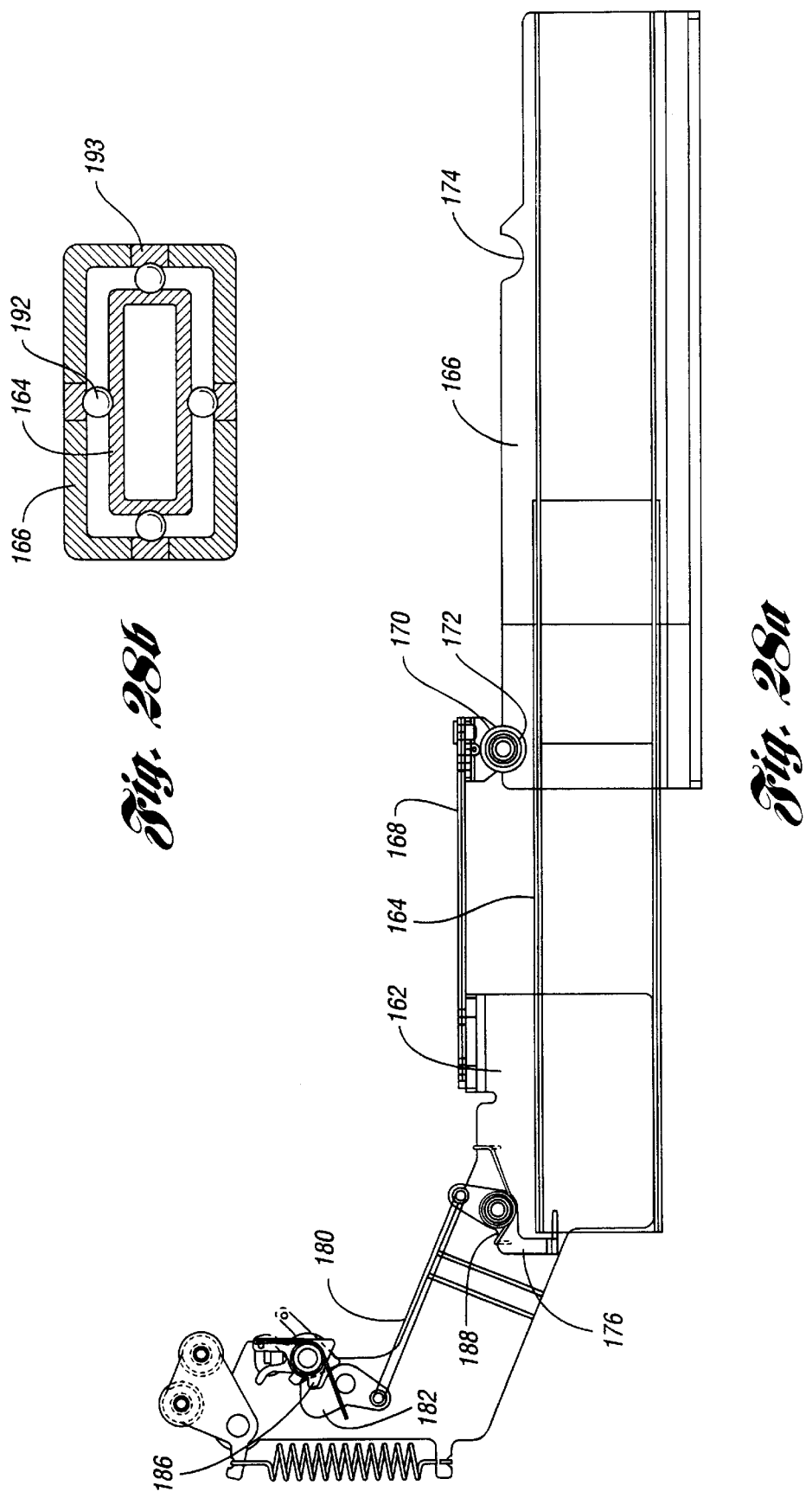

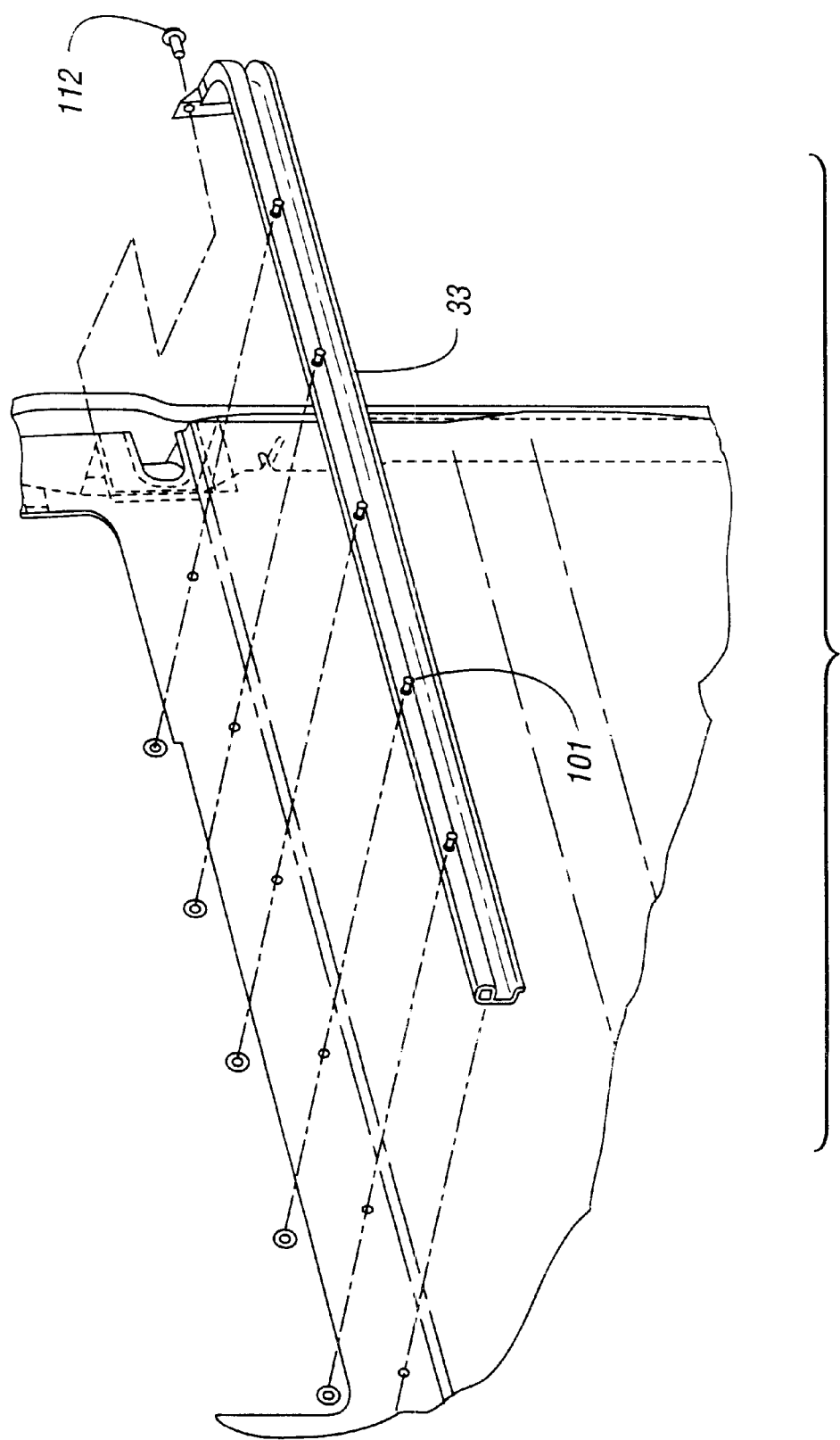

FULLY-OPENABLE SLIDABLE VEHICLE DOOR ASSEMBLY

TECHNICAL FIELD

The invention relates to slidable doors for automotive vehicles, particularly slidable side doors for van-type vehicles.

BACKGROUND ART

A conventional van-type vehicle typically has at least one side door slidably mounted for movement between a closed position in a door opening and an opened position wherein the door extends along the outer side surface of the vehicle. The door typically is slidably connected to an upper track located in the door opening (near the vehicle roof), a lower track located in the door opening (near the sill area), and a third waist-high center track located in the vehicle side wall to the rear of the door opening.

The vehicle door has arm structure extending into each track, such that the door has multiple-point slidable support on the vehicle. The travel of the door between the open and closed positions is somewhat limited because the forward arm structure for the lower track necessarily extends through the door opening.

Each of the arm structures can travel horizontally only the distance between the front and rear edges of the door opening, less the horizontal cross-sectional dimension of each arm structure. Therefore, when the door is in the fully opened position, the door opening will still be partially obstructed.

The problem of door opening access efficiency is of particular concern in compact vans wherein the slidable door has a rear edge that is cut away (or contoured) to follow the contour of the rear wheel well (tire clearance space). In such compact vans, the lower edge of the slidable door is considerably shorter than the door upper edge. The shorter door lower edge limits door travel so that a significant portion of the door opening remains covered when the slidable door is in the fully opened position.

In compact vans, the limited door opening results in inadequate aisle clearance for comfortable and unobstructed access to the rearmost seats or cargo area.

In many compact vans, there are no articulated seats that slide and tip completely forward to clear the aisle or path to the rear seats. Thus, a partially obstructed side door opening in a compact van is particularly troublesome. Often there are no grab handles at critical locations to aid in ingress and egress of a passenger into and out of the rear seats.

DISCLOSURE OF INVENTION

The present invention relates to a slidable vehicle door having support arms slidably attached to the door, whereby the door can be moved beyond the opened position determined by the geometry of the tracks in the door opening. This additional door movement provided by the slidable support arms makes it possible for the opened door to be completely out of registry with the door opening. The door opening, therefore, permits unobstructed ingress and egress.

In some compact vans, the door size and contour are dictated partially by styling considerations. The non-rectangular contoured door configuration has a tailored, stylish appearance that has visual appeal to vehicle owners who may not prefer a commercial, van-like appearance of a rectangular door. The present invention offers a solution to the door opening obstruction problem presented by a contoured (non-rectangular) door in compact van-type vehicles.

The invention includes a slidable door with an open position wherein the door extends outside the vehicle body out of registry with the door opening. Upper and lower tracks extend along the upper and lower margins of the door opening. Upper and lower guidance structures extend from the door into the tracks.

The lower door guidance structure includes a linear guide carried by the door and a slide assembly within the guide. An arm is connected to the slide assembly and to antifriction members within the lower track. The door guidance structure provides for movement of the door to an open position as the slide assembly moves along the linear guide. The door opening movement extends to a fully open position beyond the linear extent of the lower track.

Specific features of the invention will be apparent from the attached drawings and description of the invention.

BRIEF DESCRIPTION OF DRAWINGS

FIG. 3a is a view of the door of FIG. 3 when it is in the closed position;

FIG. 3b shows the door of FIG. 3 in the fully open position;

FIG. 3e is a subassembly view of the roller assembly for the lower track seen in FIGS. 3 and 3a;

FIG. 3f is a partial cross-sectional view taken along the plane of section line 3f—3f of FIG. 3d showing guide bearing balls for permitting relative linear movement of the inner and outer slidable members for the lower load-supporting mechanism;

FIG. 4 is an end view of the door of FIG. 3, looking from front to rear;

FIG. 13 is a sectional view taken in the same direction as FIG. 12, but showing a portion of the door in an intermediate position (i.e., partially open);

FIG. 14 is a sectional view taken in the same direction as FIG. 12, but showing the door in a fully open position;

FIG. 28 is a plan view of an assembly of the lower track and the relatively slidable members that accommodate extended opening movement of the sliding door of the embodiments of the invention shown in the preceding figures;

FIG. 28a is a plan view of the sliding members for the lower track door support of FIG. 28;

FIG. 28b is a schematic cross-sectional view of the sliding members of the lower track support;

FIG. 28c is a plan view showing the overall contour of the lower track;

FIG. 31 is a perspective view of the center track for supporting the alternate embodiment of the sliding door;

BEST MODE FOR CARRYING OUT THE INVENTION

Figure 2:
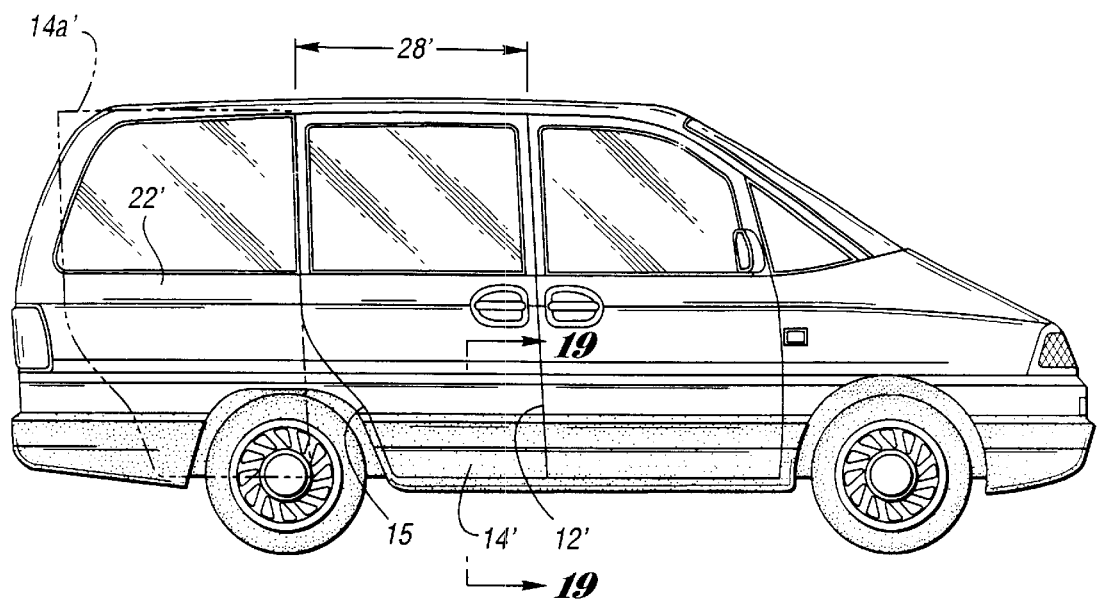
FIG. 2 is a view taken in the same direction as FIG. 1, but showing a compact van having a contoured, slidable rear door (or a pair of contoured, slidable rear doors) incorporating the invention.
Figure 2A:
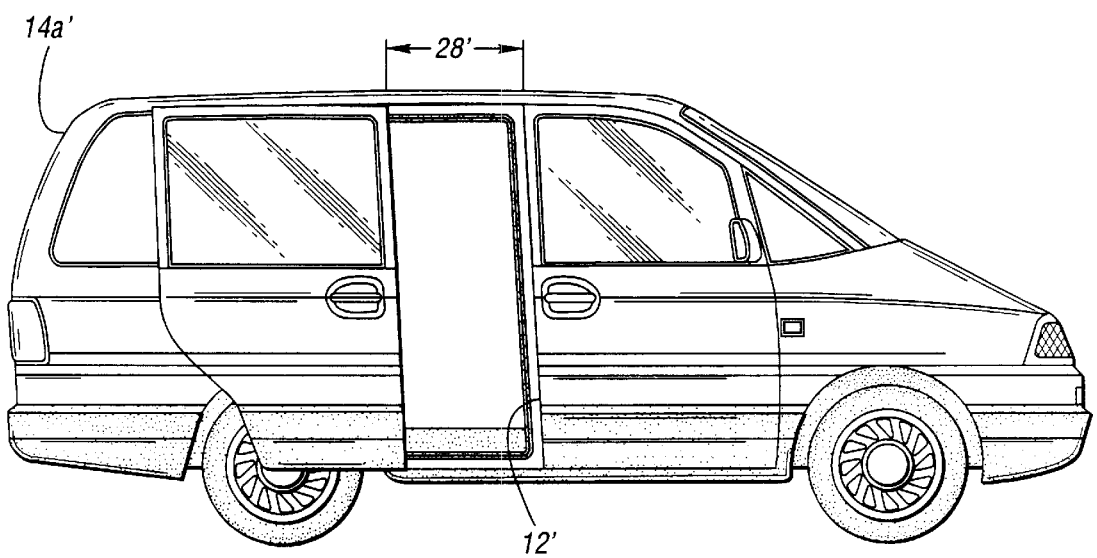
FIG. 2a shows the van of FIG. 2 as viewed in the same direction as FIG. 2, but showing the slidable door of FIG. 2 in an intermediate, open position.

FIGS. 2 and 2a show a van-type automotive vehicle having a slidable side door that includes the invention. The door is movable between a closed position (FIG. 2) and an open position (FIG. 3b).

The vehicle has a fore-and-aft geometric axis and movement of the slidable side door between the open and closed positions is in the direction of the fore-and-aft geometric axis.

Figure 7:
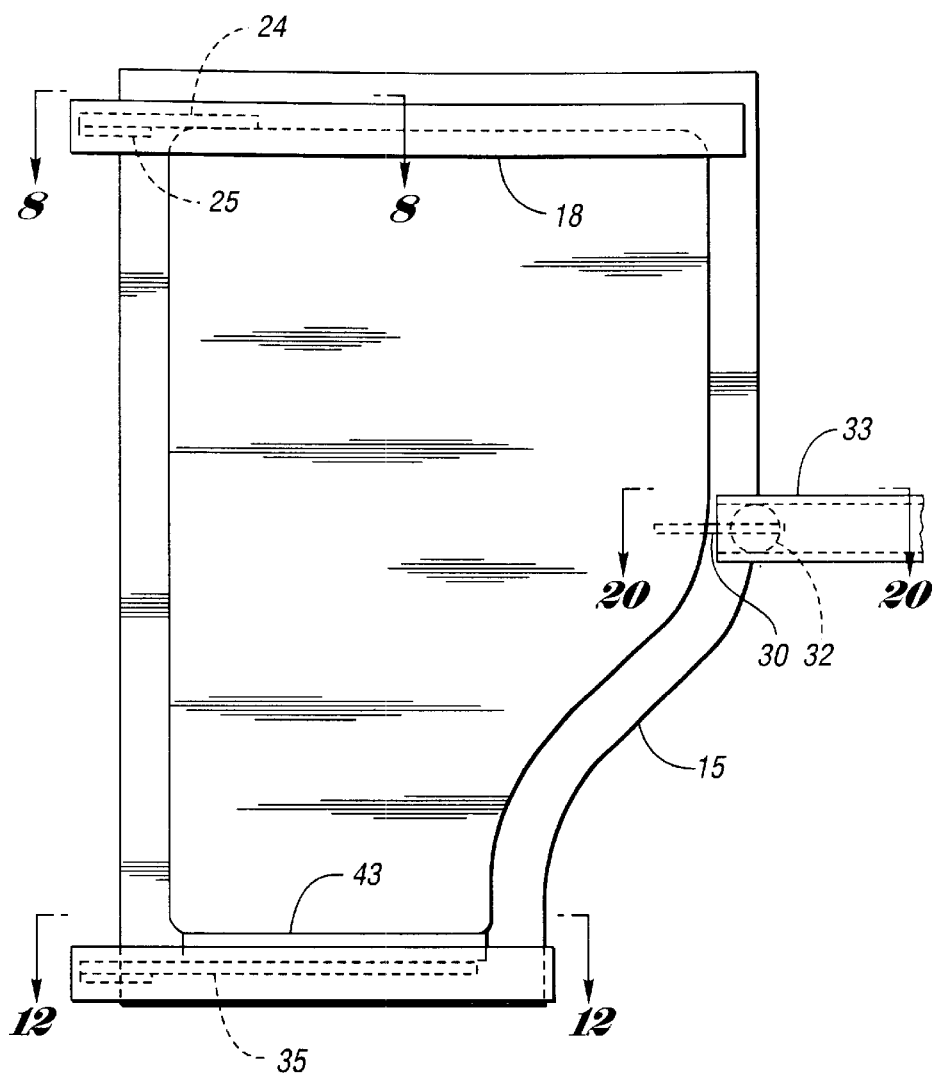
FIG. 7 is a schematic elevation view of an alternate embodiment of a slidable door for the vehicle of FIG. 2, taken from a point inside the vehicle, which illustrates track structure used to slidably support the door.

The door has a contoured rear edge, such that the upper edge of the door is longer than the lower edge. As depicted schematically in FIG. 7, the contoured door is supported and guided for slidable movement by three separate track structures, namely, an upper (overhead) track structure 18', a middle or center track structure 33', and a lower track structure 35'.

Track structures 18' and 33' may be of conventional design. The invention is concerned particularly with the lower track structure 35'.

The lower track structure has an extension capability, so that when the associated carriage for the rollers reaches its end of travel, an extension mechanism on the lower edge of the door allows added motion of the door to a fully opened position in which the door opening is fully exposed, as shown in FIG. 3b.

Figure 1:
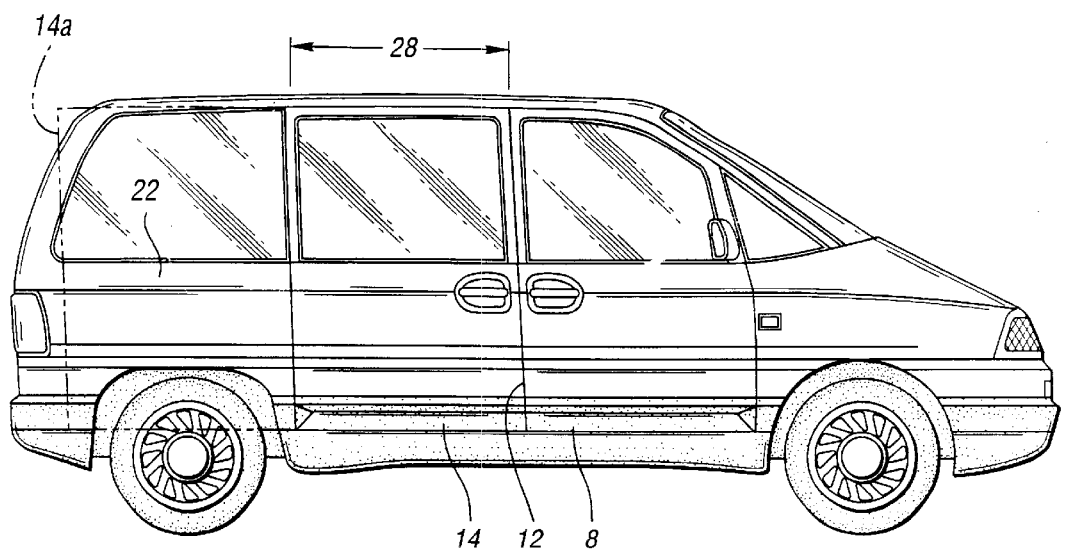
FIG. 1 is a partial, side elevational view of a conventional vehicle having a conventional, rectangular slidable door.

FIG. 1 shows a conventional full-size van having a rectangular sliding door 14. FIG. 1 is illustrated in the drawings merely to help explain the invention.

Figure 1A:
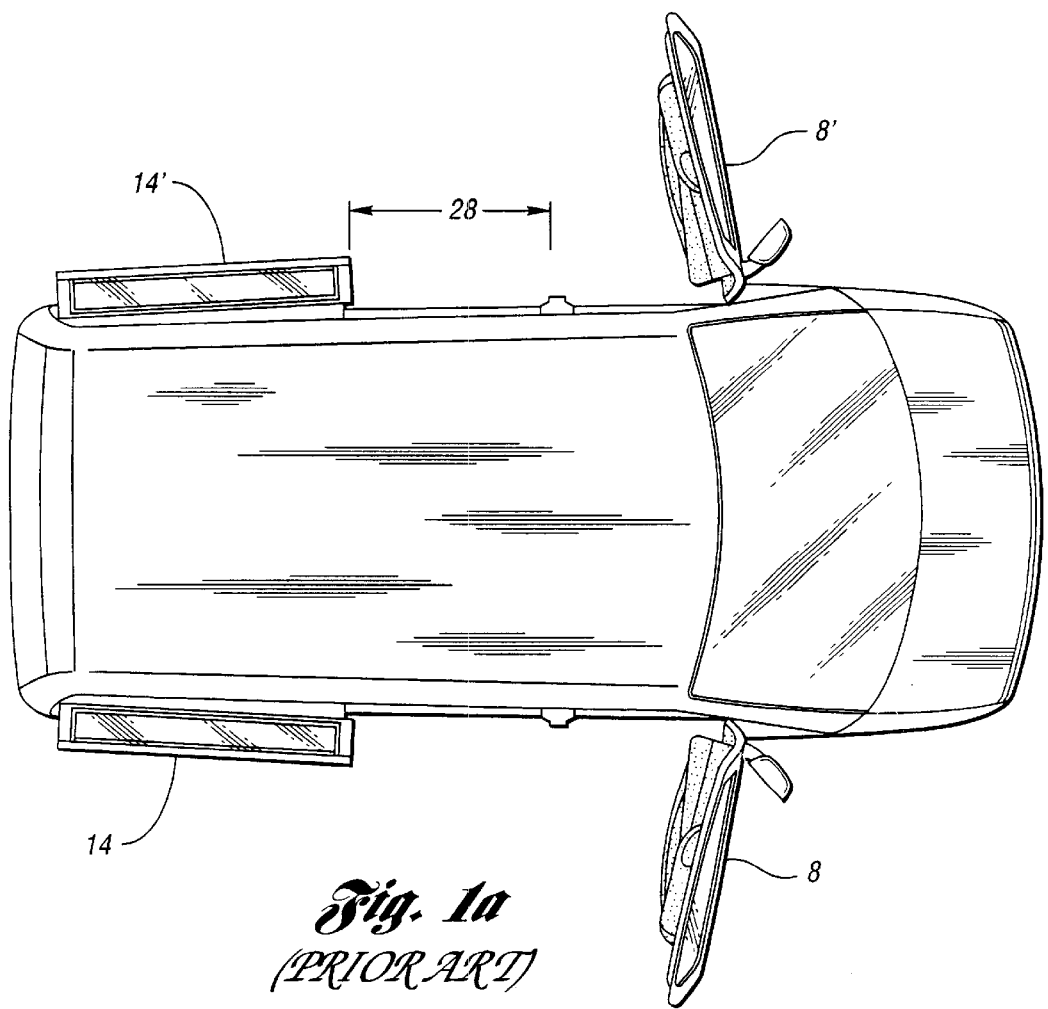
FIG. 1a is a plan view of a conventional vehicle with two slidable doors, the sliding doors being shown in their open positions adjacent the outer surface of rear body panels.

A plan view of the van of FIG. 1 is shown in FIG. 1a. The van may have two sliding rear doors, as shown at 14 and 14'.

FIG. 2 shows a mini-van having two contoured sliding doors 14' that include the invention, although the invention can be used with a van having only one sliding door. In either case, the door support structure is designed to achieve a sufficient door travel (designated in FIG. 2 by numeral 28') to fully expose the access opening when the door is in the open position. The invention concerns the mechanism for achieving complete opening of the contoured door. For clarity, however, the mechanism has been deleted from FIG. 2a.

FIG. 2a is a view similar to FIG. 2, but the door is shown in the intermediate position.

More specifically, FIG. 1 shows in side elevation a conventional full-size van having a front door 8 hinged along its front edge for access to the front seat, and a rear door 14 slidably mounted on the vehicle body for access to the rear seat (or seats). Rear door 14 has a closed position flush with the vehicle body, and an open position displaced rearwardly from the access opening 12 and extending alongside the vehicle body. When the slidable door is in the open position, as depicted by dashed lines 14a, substantially the entire width dimension 28' of the door opening is available for ingress and egress.

FIG. 1a shows a plan view of the van of FIG. 1. It shows the front and rear doors 8' and 14' on the left side of the van.

FIG. 2 shows in side elevation a compact van that can utilize the present invention. In this case, the slidable rear door 14' has its rear edge 15 contoured to follow the contour of the fender opening for the rear wheel. The position of the rear door of the present invention in the open condition is depicted by dashed lines 14a'. According to a feature of the invention, the entire width 28' of the door opening is exposed (accessible when the rear door 14' is fully opened). The reference numerals in FIG. 2 that have a counterpart in FIG. 1 have been used with prime notations.

The invention enables the FIG. 2 mini-van to have the same effective access opening efficiency as the FIG. 1 full-size van. For example, the dimension 28' of FIG. 2 is substantially the same as the dimension 28 in FIGS. 1 and 1a for vans of similar size.

FIG. 2a shows the position for the door incorporating the invention when the door is moved to the intermediate position toward the fully open position.

The doors shown in FIGS. 1 and 2 are slidably supported and guided on the vehicle body by three track structures, namely: an upper track in the roof area of the vehicle body, a lower track in the lower sill area of the vehicle body, and a middle or center track located waist high in the rear section 22 of the vehicle body behind access opening 12. In the case of the FIG. 2 compact van, the lower track provides only lateral support (or guidance), not vertical load support.

FIGS. 3c, 3d, 3e, 3f, 4, 5 and 6 show details of a preferred embodiment of the door support mechanism for the door illustrated in FIGS. 2 and 2a. The reference numerals used in these figures carry prime notations since there are counterpart numerals in alternate embodiments of the invention described with reference to FIGS. 7–32c.

Figure 3:
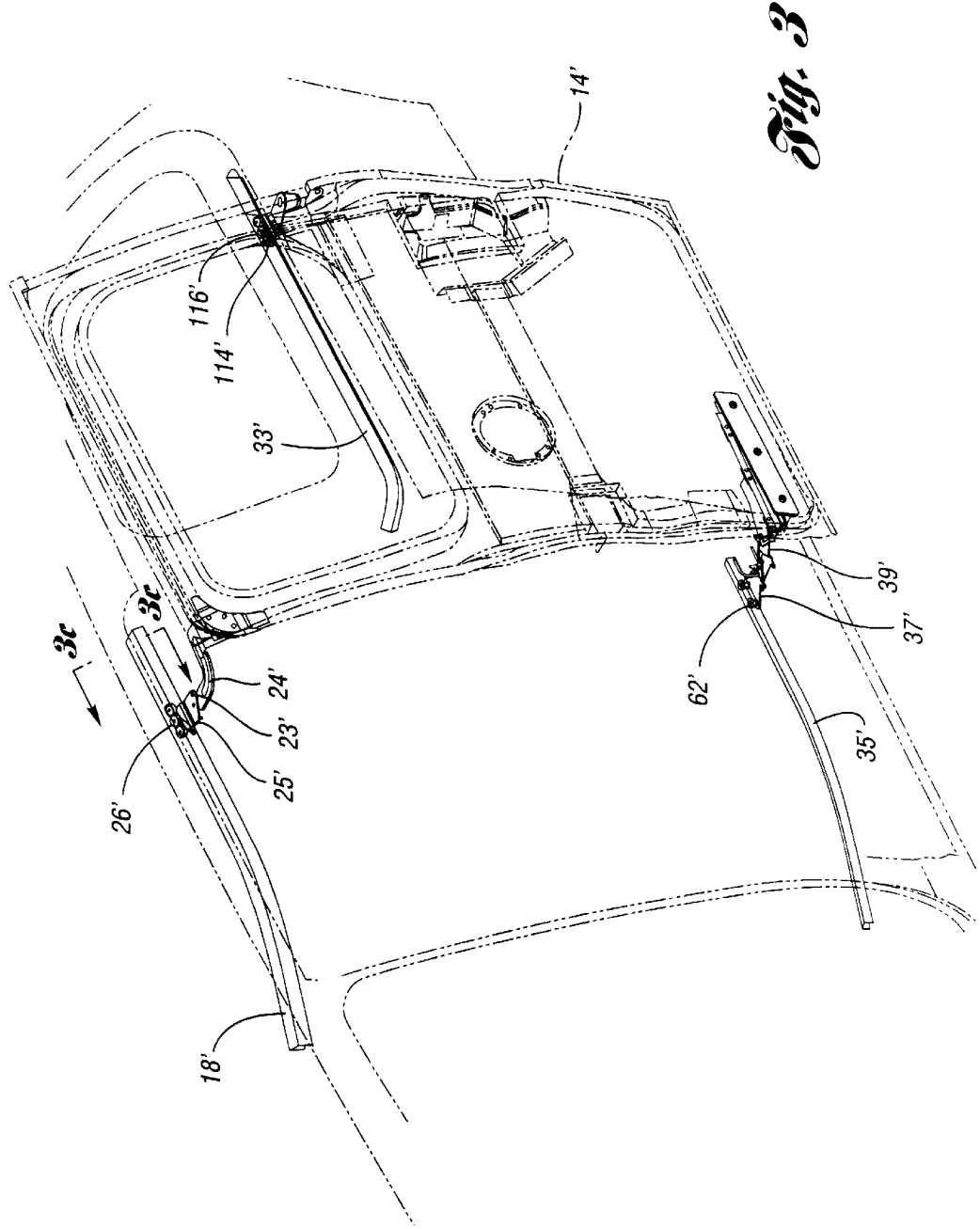
FIG. 3 is a detailed perspective view of the left-side slidable door of FIG. 2 in the intermediate open position.

FIG. 3 shows a left-hand sliding door 14 when it is in its intermediate open position. FIG. 3a is a view of the same sliding door 14 when it is in its fully closed position. The door is fully open in FIG. 3b.

FIGS. 3, 3a and 4 show at 24' a support arm for the upper track 18'. The upper track has a roller assembly comprising rollers 26', which are journalled on a roller carrier 25'. The carrier 25' is pivoted at 23' to the inboard end of the support arm 24'.

Figure 3C:
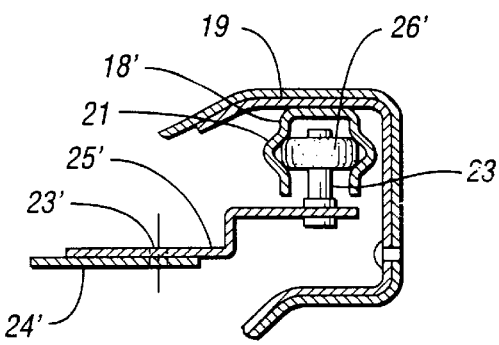
FIG. 3c is a partial cross-sectional view taken along section line 3c—3c in FIG. 3.

The rollers 26' are situated within the track 18', best seen in FIG. 3c. The track 18' includes an outer track member 19 in which the track 18' is secured, preferably by welding. The rollers 26 are located in a pair of grooves 21. They are mounted for rotation about a vertical axis by mounting shafts 23. Because of the interlocking of the rollers in the grooves 21, the rollers 26' are capable of guiding the door in the track 18' while also accommodating a vertical load on the track due to the weight of the door.

Figure 5:
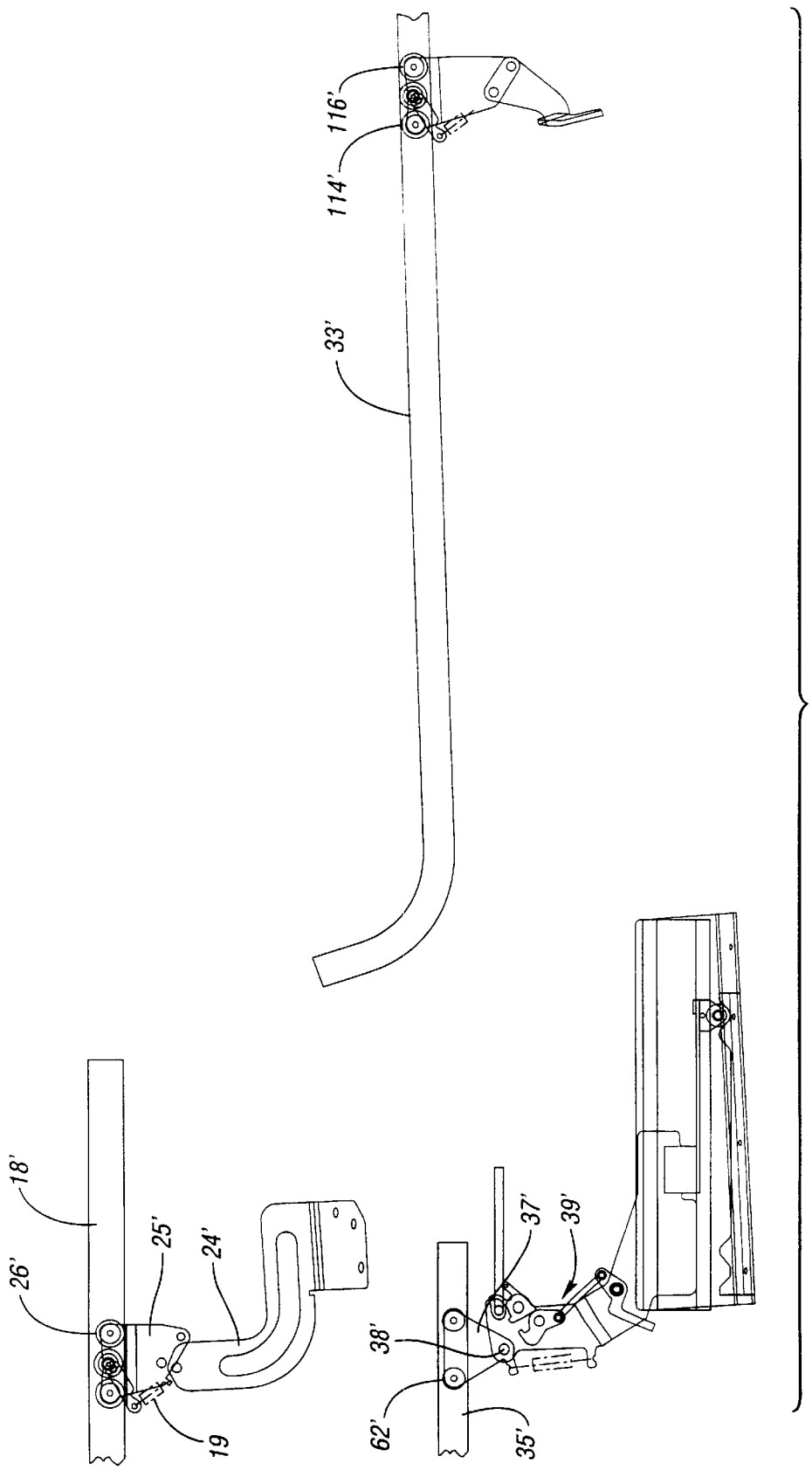
FIG. 5 is a partial assembly view of the door supporting and guiding tracks for the door of FIG. 3.

The rollers 114' and 116' for the center track assembly, as shown in FIG. 5, are received in the track 33' in a manner similar to the upper track design shown in FIG. 3c. That is, they are mounted for rotation about vertical axes, and the individual rollers are received in grooves defined by the adjacent walls of the track 33' so that they can accommodate vertical loads as they guide the rollers in a fore-and-aft direction in the track 33'. The center support is shown in the cross-sectional view of FIG. 6 for the door 14'.

The lower guide assembly for the door 14' is seen in FIGS. 4 and 5. The lower guide comprises rollers 62' which are received in lower track 351. These rollers are carried by a roller carrier 37' which is pivoted at 38' on support arm 39'. The track 35' is secured to the lower frame member 60' (FIG. 4) for the vehicle.

The rollers 62', unlike the rollers 26' for the upper support, are not designed to accommodate vertical loads. The track 35' in which the rollers 62' are situated is not provided with longitudinally extending grooves corresponding to the grooves 21 of FIG. 3b. The rollers 62' engage the sides of the track 35' to provide guidance for the lower end of the door 14', but all of the weight of the door is accommodated by the upper support and the center support, which includes tracks 18' and 33', respectively.

Figure 3D:
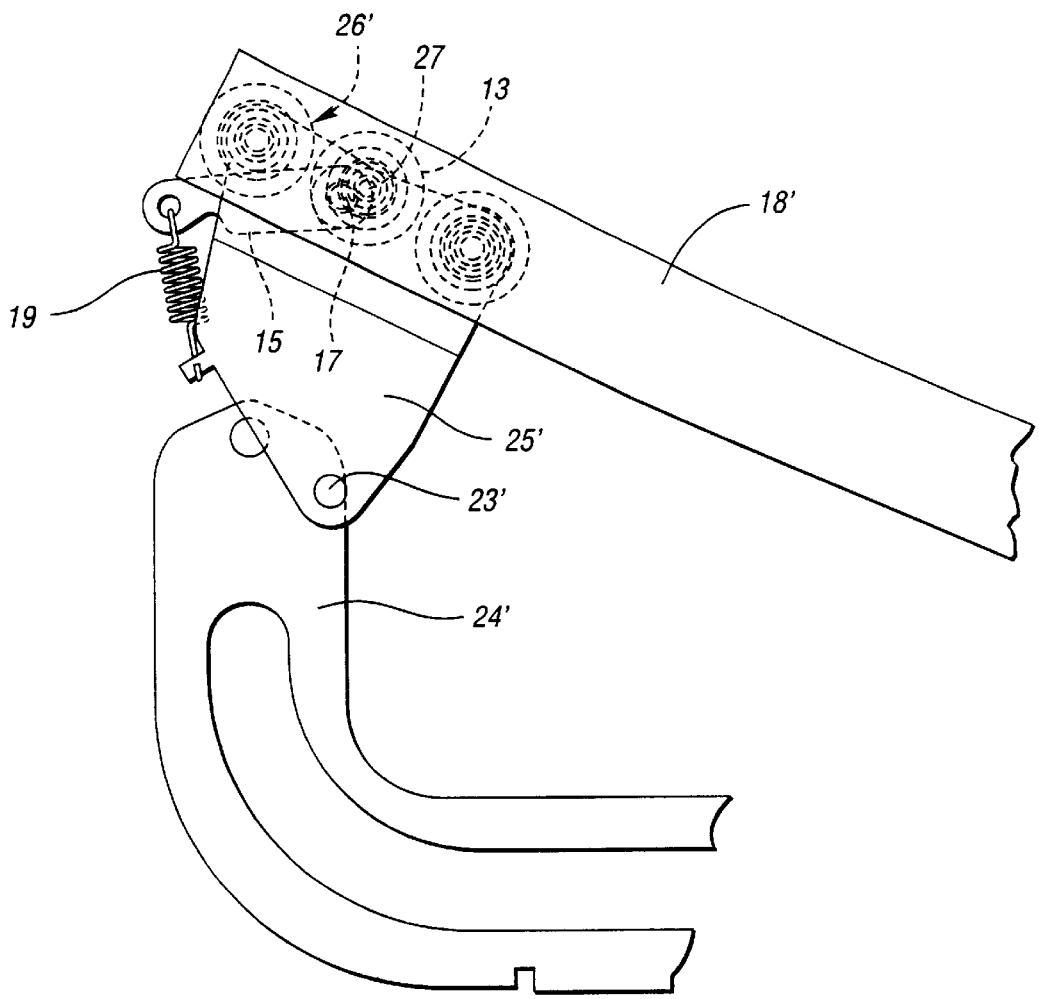
FIG. 3d is an enlarged subassembly view of the roller assembly for the upper track including a tension spring for loading a center roller for the upper roller assembly.

FIG. 3d shows an enlarged detailed assembly view of the rollers for the upper track 18'. There is a pair of rollers 26 located on opposite sides of a center roller 13. The carrier 25' rotatably journals the roller 13, which is mounted on a shaft received in an oversized hole in carrier 25'.

A side load lever 15 is pivoted at 17 on the carrier 25'. The outboard end of the lever 15 is biased by spring 19 in a counterclockwise direction, one end of the spring being anchored on a boss formed on the carrier 25'. The center shaft 27 for the roller 13 is received through the opposite end of the lever 15 and is biased against the adjacent side wall of the track 18' due to the force moment created by the spring 19. That same moment causes the carrier 25' to move the rollers 26 against the opposite side wall of the track 18'. Thus, the spring 19 acts to prevent rattle of the roller assembly when it is installed in the track 18'.

The center track 33', as best seen in FIG. 5, has a roller assembly shown at 114' and 116' that corresponds to the rollers 26' for the upper track. As in the case of the rollers 26', the center track roller assembly has an intermediate roller located between the two load-bearing rollers 114' and 116'. The center roller is mounted on a lever similar to the lever 15, shown in FIG. 3d. Further, the lever for the center roller for the center track has a spring corresponding to spring 19, shown in FIG. 3c. Side loads are established on the rollers for the center track that prevent rattle when the rollers are installed.

The arm 39' shown in FIG. 5 is an assembly that is similar to the assembly that will be described with respect to an alternate design shown in FIGS. 28, 28a and 28c.

FIGS. 3e and 3f show details of the relatively movable inner member and outer member of the lower door support mechanism. Numeral 81 is a support plate that forms a part of the door structure. The mechanism of FIGS. 3e and 3f includes an inner slidable member 214 and an outer slidable member 216. The slidable members are disposed in a housing 218 extending in a fore-and-aft direction. The housing 218 is secured to the plate 81 by attachment weld nuts 79 as indicated.

The outer slidable member 216 has longitudinally spaced openings that receive anti-friction guide elements, including bearing balls 220. The balls are retained by longitudinal grooves defined by the walls of the slidable member 214 and the slidable member 216. The grooves are indicated in FIG. 3f at 224 and 226. The outer slidable member 216 acts as a carrier for the guide bearing balls 220, which permit relative sliding motion between the housing 218 and the inner slidable member 214. The arm 66' is secured, as shown in FIG. 3d, to the inner slidable member 214.

Figure 6:
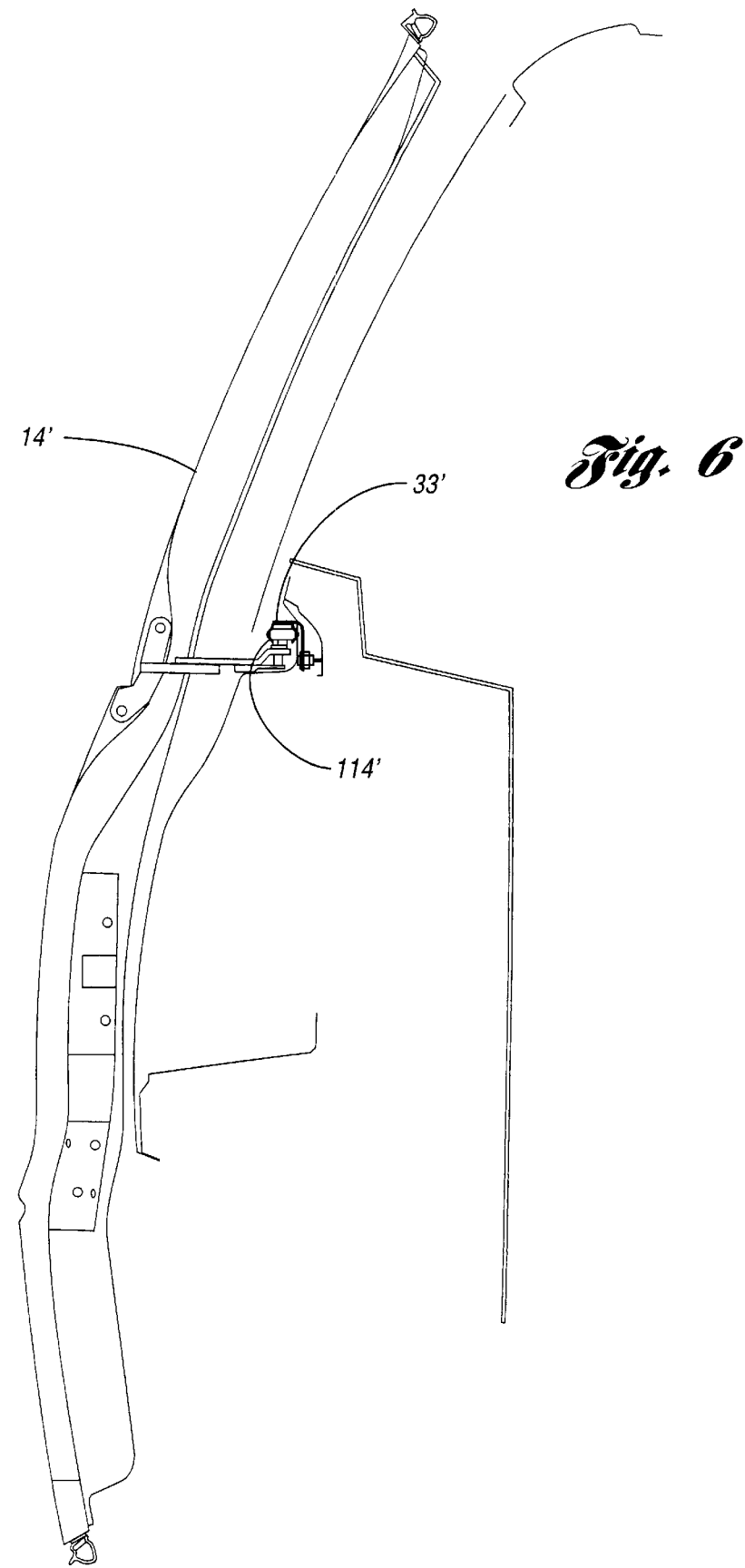
FIG. 6 is a partial end view, looking from rear to front, of a left side slidable door of the vehicle of FIG. 2.

FIG. 6 shows in cross-section a center support for the sliding door 14' (left side). The track 33' and the rollers 114' function in the same way as the track 33 and rollers 32 of an alternate embodiment, which will be described with reference to FIGS. 7–11.

Figure 20:
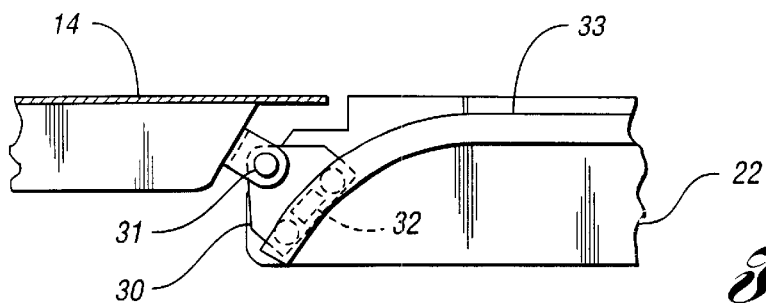
FIG. 20 is a partial sectional view taken on section line 20—20 in FIG. 7, illustrating a center or middle track structure that partially supports the slidable door.
Figure 21:
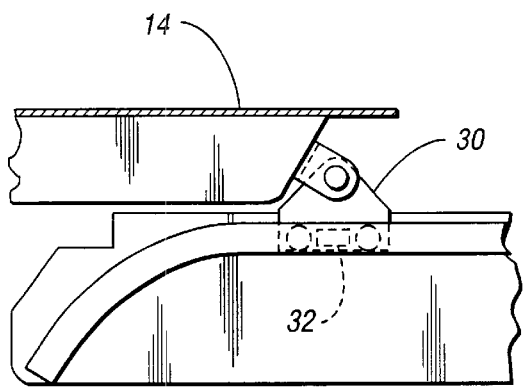
FIG. 21 is a view taken in the same direction as FIG. 20, but showing a portion of the door in an intermediate position.

FIGS. 7–11 show schematically some features of an alternate design of the upper door support structure for the contoured slidable door shown in FIG. 2a. FIGS. 20 and 21 show schematically some features of an alternate design of the center support structure for the FIG. 2a contoured slidable door. FIGS. 12–18 show schematically some features of an alternate design for the lower support (guide) structure for the FIG. 2a contoured door. As indicated earlier, the upper door support structure and the middle door support structure may be of conventional design. The invention relates to the lower door guidance structure.

Figure 8:
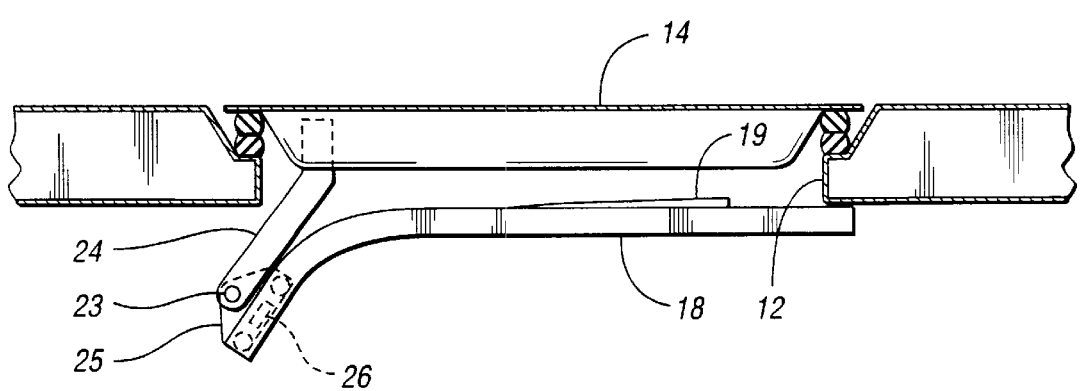
FIG. 8 is a sectional, schematic view of the alternate embodiment of FIG. 7, taken on section line 8—8 in FIG. 7, illustrating an upper track structure for supporting a right-side slidable door.

Referring to FIG. 8, the upper support structure comprises an overhead track 18 secured within the roof area of the vehicle body, and an arm structure 24 extending from door 14. Arm structure 24 has a pivotal connection 23 with a carriage 25 that mounts suitable rollers 26 within track 18. The forward end of track 18 is curved toward the vehicle body centerline so that when the door nears the closed position, the door moves into access opening 12 in the vehicle body.

Figure 10:
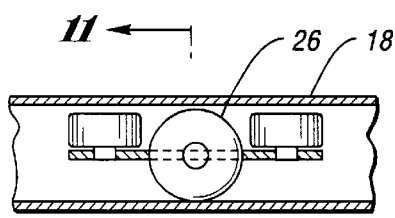
FIG. 10 is a partial sectional view taken on section line 10—10 of FIG. 9.
Figure 11:
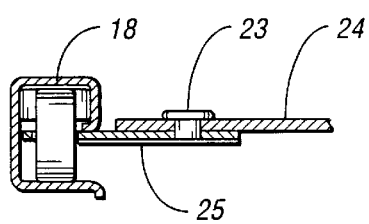
FIG. 11 is a partial sectional view taken on line 11—11 in FIG. 10.

FIGS. 10 and 11 show a roller arrangement that can be used on carriage 25. As shown, there are two vertical axis rollers and one horizontal axis roller. The roller arrangement is conventional.

Figure 9:
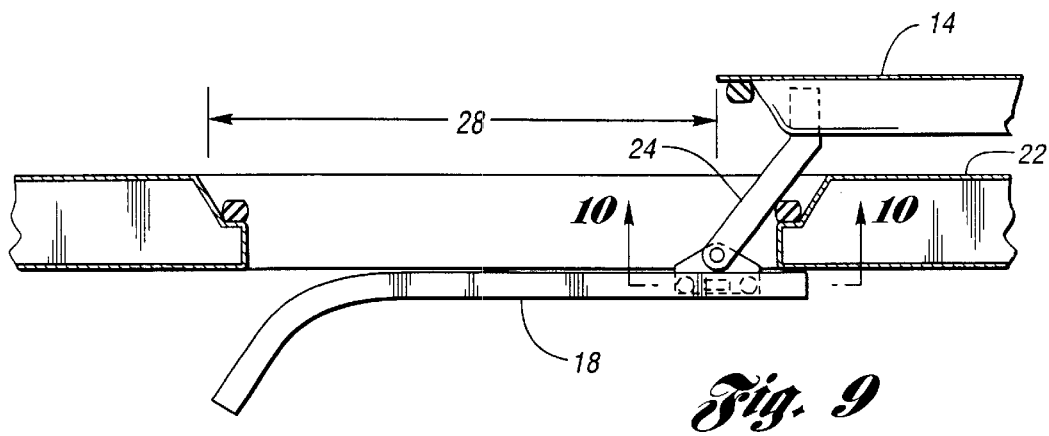
FIG. 9 is a schematic view of an alternate embodiment taken in the same direction as FIG. 8, but showing the door in an open position.

FIG. 9 partially shows schematically an alternate upper door support structure with the door 14 in the open position. The door is spaced from the vehicle body in parallel disposition with respect to the body side surface 22.

Referring to FIG. 20, the alternate design has a middle or center support structure for the door comprising a carriage 30 with a pivot connection 31 with the door at the door rear edge. The carriage supports guide and load-supporting rollers 32 within a track 33 suitably mounted on the vehicle body panel 22. The position of carriage 30, when door 14 is out of the access opening 12, is shown in FIG. 21.

The rollers 32 on carriage 30 may be constructed and arranged in a fashion similar to the rollers depicted in FIG. 10 and 11. In both cases, the rollers provide vertical and lateral support for door 14 while the door is moving between its open and closed positions.

Figure 12:
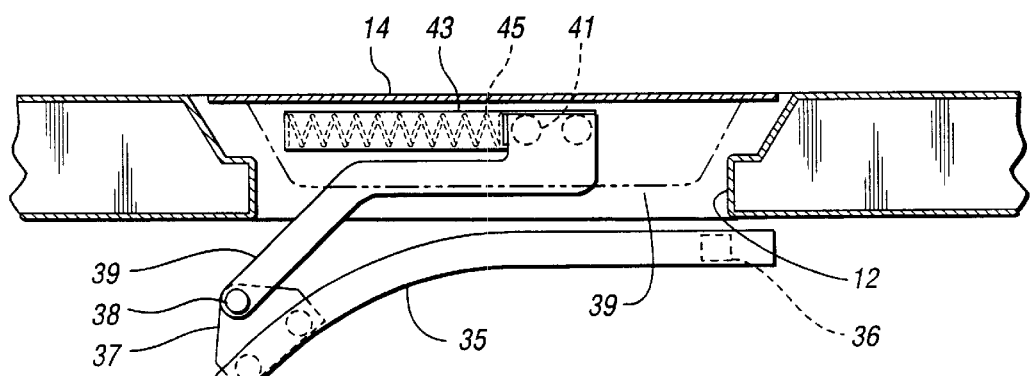
FIG. 12 is a sectional view, taken on section line 12—12 in FIG. 7, illustrating a lower track structure for stabilizing the slidable door.
Figure 15:
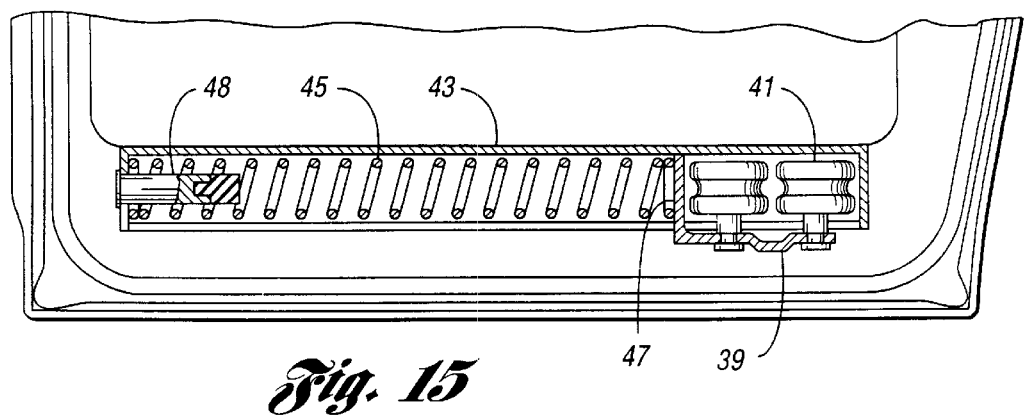
FIG. 15 is an enlarged sectional view taken on section line 15—15 in FIG. 13.
Figures 16, 18:
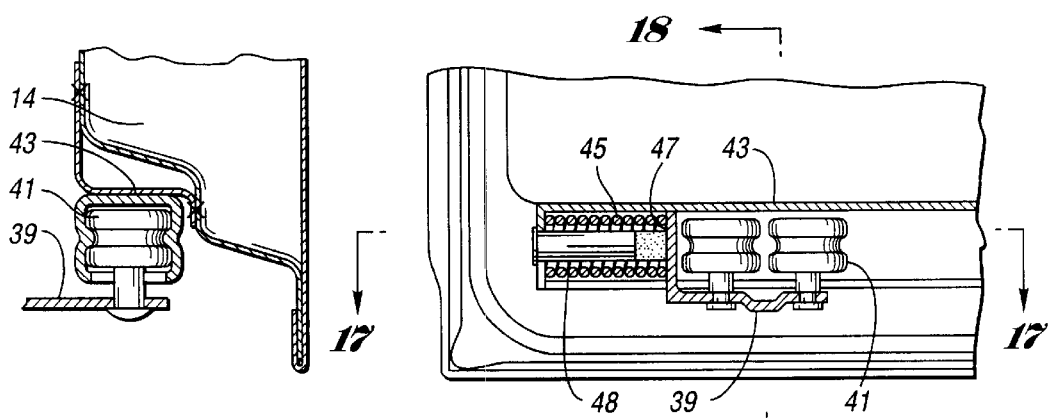
FIG. 16 is a partial sectional view taken in the same direction as FIG. 15, but showing the door in the FIG. 14 open position.
FIG. 18 is a transverse sectional view taken on line 18—18 in FIG. 13.
Figure 17:
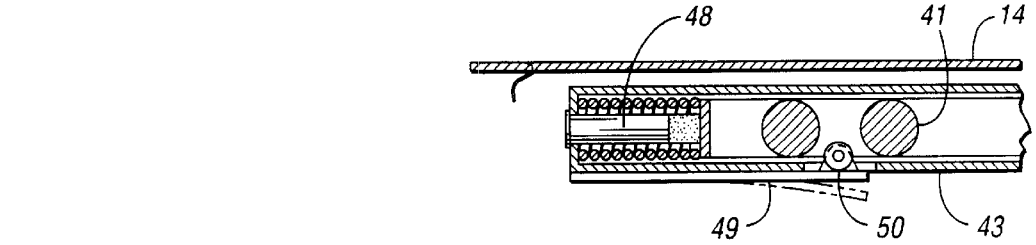
FIG. 17 is a sectional view taken on section line 17—17 in FIG. 17.
Figure 19:
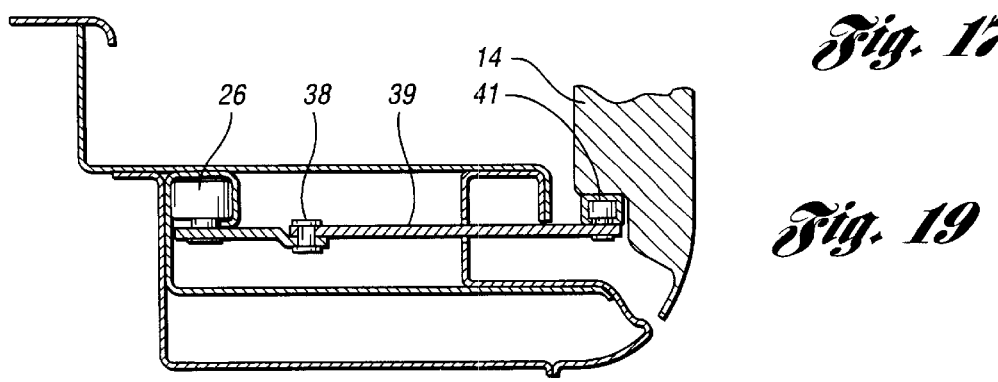
FIG. 19 is a partial sectional view taken generally on section line 19—19 in FIG. 2.

Referring to FIGS. 12–14, the lower stabilization (guide) track structure for the contoured door of the alternative design comprises a lower track 35 mounted in the vehicle body at the lower area of the access opening 12, and a carriage 37 movable within track 35 in a left-to-right direction from the FIG. 12 position. The carriage carries suitable guide rollers 62 within the track.

Carriage 37 is connected to door 14 via an elongated guide arm 39 that extends along the lower edge of the door. One end of the arm 39 has a pivotal connection 38 with carriage 37. The other end of arm 39 carries guide rollers 41 located within a linear guide 43, suitably fixed to door 14, whereby guide 43 can slide relative to the rear end of arm 39. Rollers 41 are the equivalent of a low-friction slide. A rear section of arm 39 extends underneath linear guide 43 to provide a mounting surface for rollers 41.

The forward end of arm 39 has a pivot connection 38 with carriage 37. Guide arm 39 and rollers 41 provide horizontal support (guidance) for the door, not vertical support. Vertical support is provided by the upper support arm 24 and middle or center support arm (carriage) 30.

The contoured configuration of the FIG. 2a door is such that the lower edge of the door is shorter than the upper edge. Accordingly, the lower track 35 is shorter than the upper track 18. When the door is pulled toward the open position, carriage 37 (seen in FIG. 9) will reach the rear end of track 35 while carriage 25 (seen in FIG. 8) is at an intermediate point along track 18. A stop or bumper 36 may be located in track 35 to limit rightward (rearward) motion of carriage 37 and guide arm 39 (seen in FIG. 12).

The function of linear guide 43 (FIGS. 12–17) is to permit the door to move rearwardly after carriage 37 has reached the rear end of track 35. Assuming that carriage 37 is at the rear end of track 35 (as shown in FIG. 13), the door can be moved farther rearwardly due to linear guide 43 on the door. Linear guide 43 can slide along rollers 41 in a left-to-right direction, whereby the contoured door will have an open position exposing the full width dimension 28' of the access opening (as shown in FIG. 2). FIG. 14 shows the relative position of rollers 41 and linear guide 43 when door 14 is in the FIG. 3 open position.

A compression coil spring 45 can be located within linear guide 43 to normally bias rollers 41 toward the rear end of linear guide 43, whereby the guide arm 39 has a desired orientation with respect to the door and track 35 during return motion of the door to the closed position. Spring 45 is a comparatively light spring that does not prevent the door from moving to the full open position.

FIGS. 15–18 show some features of the door stabilization system shown more generally (and schematically) in FIGS. 12–14. Guide arm 39 has an upstanding wall 47 that isolates the coil spring from rollers 41. When linear guide 43 (on door 14) reaches the FIG. 17 position, wall 47 abuts a bumper 48 located within guide 43 to prevent possible entanglement of the spring coils. FIG. 14 represents the open position of the door.

As an optional feature of the invention, a spring leaf detent 49 can be provided on linear guide 43 to prevent premature return of door 14 from the open position. The left end of spring leaf 49 is fixed to the outer surface of guide 43, while the right end of spring leaf 49 carries a detent roller 50. As linear guide 43 moves rightward to the FIG. 17 position, a roller 41 cams the detent outwardly. The spring force of spring leaf 49 returns the detent roller 50 to the detent position.

In van doors equipped with a typical handle-operated latch, the latch holds the door in the open position. In such a case, the spring leaf detent 49 may not be required.

Figures 24, 25:
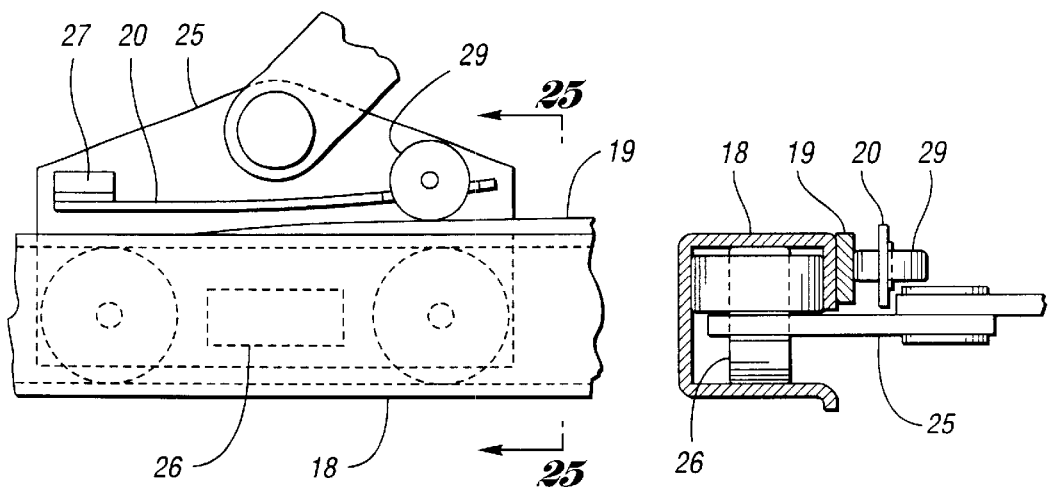
FIG. 24 is a fragmentary plan view of a carriage structure that can be used on the upper door support mechanism of FIG. 8.
FIG. 25 is a transverse sectional view taken on line 25—25 in FIG. 21.

When the door is manually returned from the FIG. 14 open position toward the FIG. 12 closed position, the coil spring 45 exerts a biasing action on abutment wall 47 so that initially arm 39 remains in the position shown in FIGS. 13 and 14. During the last stage of door motion, linear guide 43 remains motionless relative to arm 39 as arm 39 and carriage 37 move from the FIG. 13 position to the FIG. 12 position FIGS. 24 and 25 show schematically a resistance mechanism that can be used on the upper door support structure (FIGS. 8 and 9) to keep motion of the upper door support structure in synchronism with the lower door stabilization structure (FIG. 12–14) during door movement. In this connection, it should be noted that when the door is moving between the FIG. 13 position and the FIG. 14 position, spring 45 exerts a leftward force on the lower edge of the door. There is no corresponding force on the upper edge of the door. FIGS. 24 and 25 show a detent mechanism that can be used to exert a detent balancing force on the upper edge of the door, whereby the upper and lower edges of the door move synchronously without any binding action.

As shown in FIGS. 24 and 25, the detent mechanism includes a spring leaf 20 having one end mounted on a bracket 27 secured to carriage 25. The other end of spring leaf 20 carries a roller 29 5 adapted to register with an elongated projection 19 located on an exterior surface of track 18.

Projection 19 is oriented along track 18 so that roller 29 comes into initial contact with projection 19 when lower arm 39 reaches the FIG. 13 position (assuming the door is being moved in the opening direction). As roller 29 rolls along projection 19, the roller exerts a force on the stationary projection (due to the spring bias provided by leaf spring 20).

The resistance to door movement is designed to approximate the door retarding force provided by spring 45 when the door moves between the FIG. 13 position and the FIG. 14 position. The net effect is to keep the upper and lower edges of the door in synchronism to prevent or minimize any binding action that might occur along the lower door stabilization mechanism. This resistance is another optional feature of the invention.

Figure 22:
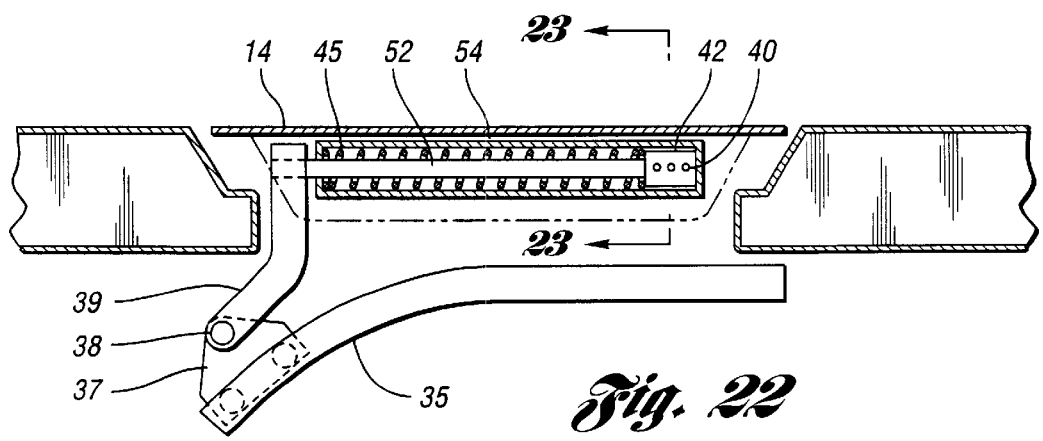
FIG. 22 is a view taken in the same direction as FIG. 20, but illustrating a different door stabilizing structure embodying the invention.
Figure 23:
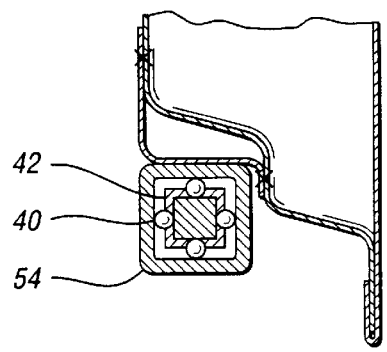
FIG. 23 is a transverse sectional view taken on line 23—23 in FIG. 19.

FIG. 22 and 23 show still another mechanism that can be used along the lower edge of door 14 to stabilize (or guide) the door. As shown in FIG. 22, guide arm 39 has a pivot connection 38 with carriage 37 and a rod element 52 extending rearwardly from arm 39 within a closed linear guide 54 fixed to the door. The rear end of rod element 52 has a piston 42 thereon for mounting antifriction ball or roller elements 40 within guide 54. In the embodiment shown in FIG. 22, the antifriction elements are antifriction balls having rolling engagement with interior side surfaces of linear guide 54.

The door guidance system of FIGS. 22 and 23 operates in a similar fashion to the door guidance structure of FIGS. 12–14. In each case, the guide (support) structure enables a contoured slidable door to be opened to a position wherein the entire width of the access opening is fully exposed. The lower door guidance structure (FIG. 12 or FIG. 22) stabilizes the door against horizontal play or twist, toward or away from the vehicle when the door is in the open position.

Figure 26:
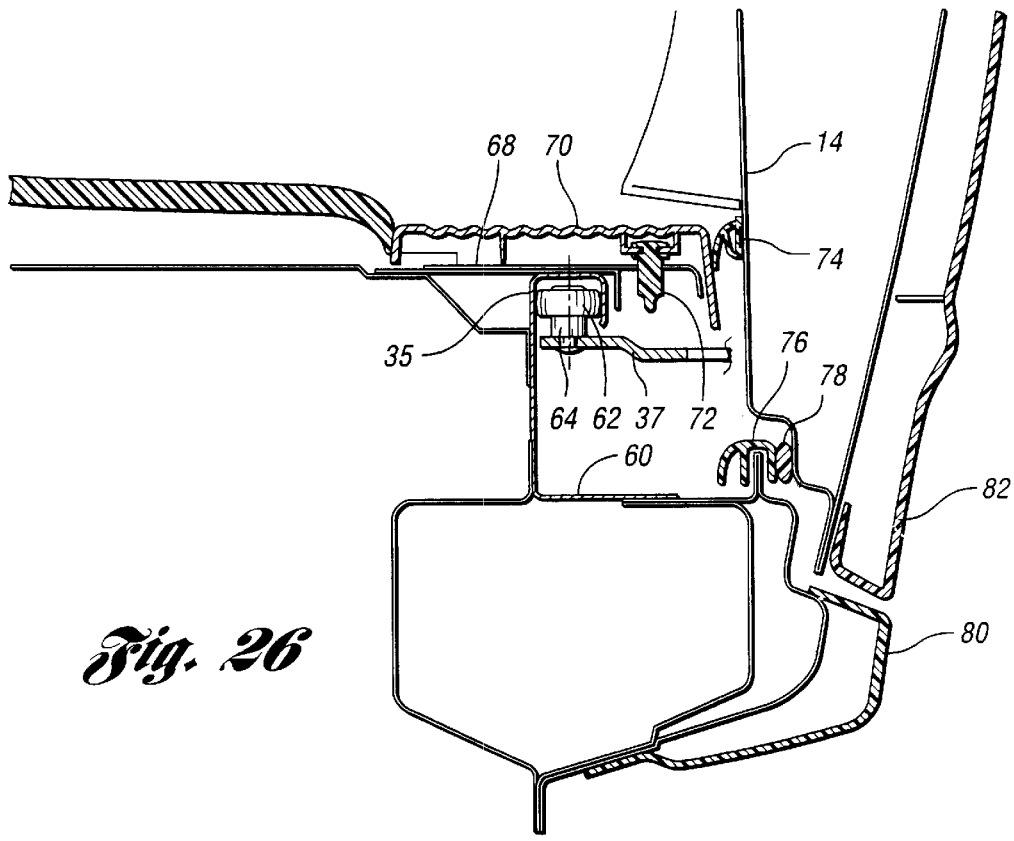
FIG. 26 is a partial cross-sectional view of the sill portion of a sliding door for a van that incorporates an alternate embodiment of the invention.
Figure 27:
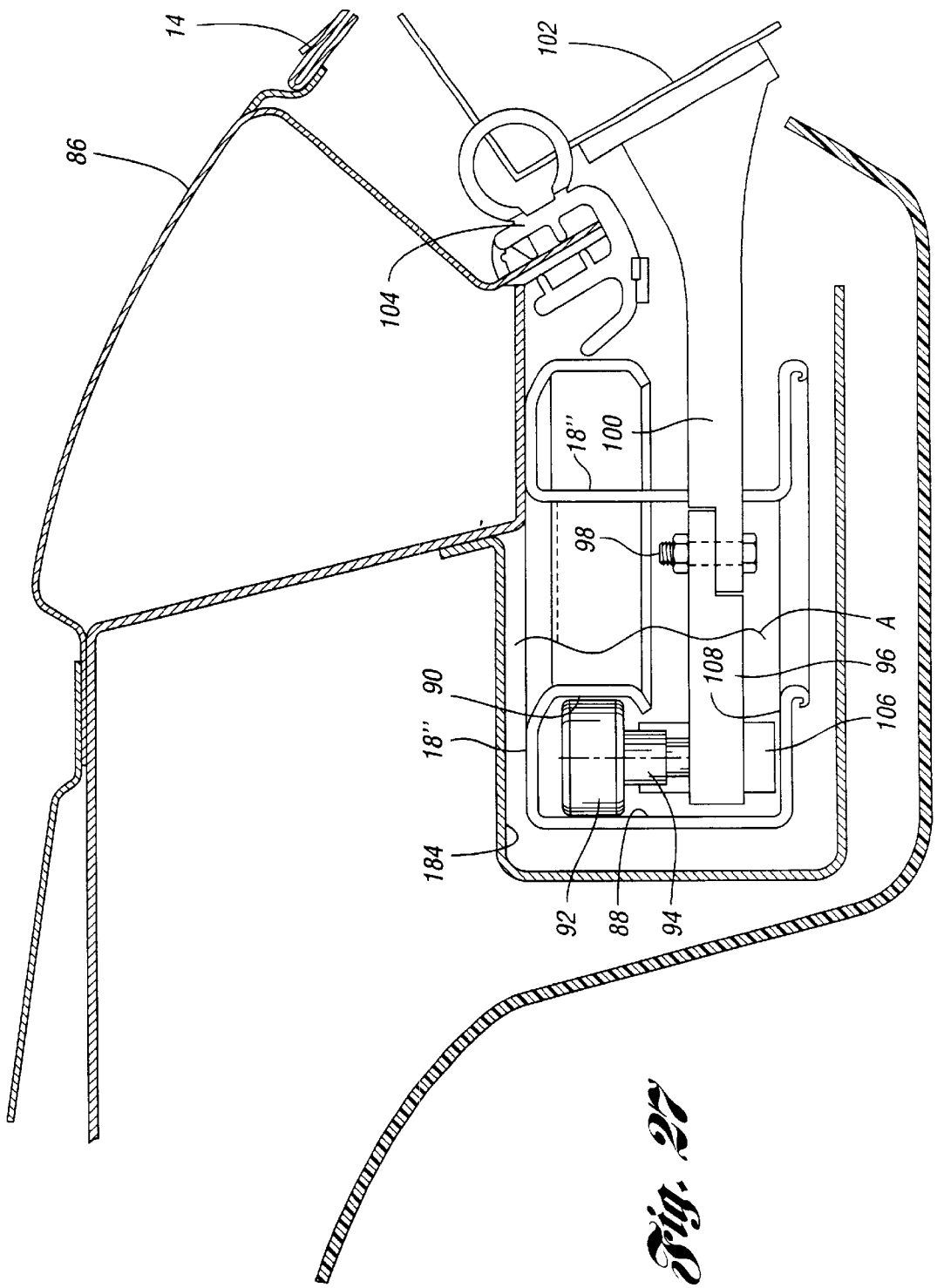
FIG. 27 is a cross-sectional view of the overhead track for supporting an alternate embodiment of a sliding vehicle door.

FIGS. 26–32a illustrate still another embodiment of the invention similar to the embodiment of FIGS. 3–6. FIG. 26 is a cross-sectional view of the sill portion of the rear right-hand door opening looking from rear to front. The plane of the sectional view of FIG. 27 is transverse to the foreand-aft vehicle center plane.

The lower track 35 (FIG. 26) is secured to the vehicle body frame structure shown at 60. As mentioned previously, the lower track 35 serves as a guide for the door 14. It is not a load-bearing track, as in the case of the upper track 18 and the center track 33.

A guide roller 62 located within the track 35 is capable of bearing against the inner walls of the track 35. The guide rollers 62 rotate about a vertical axis. They are supported by roller support shafts 64, which are secured to a carrier 37.

The floor pan 68 of the passenger compartment (seen in FIG. 26) provides support for the track 35. A garnishment 70 for the floor pan 68 is secured to the floor pan by fasteners 72. Trim moldings 74 and 76 in door sill 78 isolate the passenger compartment from the exterior of the vehicle when the door 14 is closed. The outer body panel and the outer door panel are shown respectively at 80 and 82.

FIG. 27 is a cross-sectional view taken in a transverse direction through the upper track 18". For purposes of illustration, the cross-sectional view of FIG. 27, as seen on the left side of reference line A, is displaced 180° with respect to the cross-sectional view of track 18" on the right side of the reference line A. This is done to illustrate more precisely the details of the support rollers for the upper track 18".

The track 18", as seen in FIG. 27, is located in a recess 184 formed in the outer body panel portion 86. The track 181" is secured by fasteners within the recess 184.

The track 18" has spaced vertical walls 88 and 90 that are engaged by guide rollers 92 journalled on vertical roller support shafts 94. Shafts 94 are secured to a roller carrier 96, which is connected by a suitable pivot bolt 98 to support arm 100. The carrier 96 may oscillate about the axis of the bolt 98 to facilitate maneuvering of the rollers 92 through the track 18. The support arm 100 is secured at its right end, as seen in FIG. 27, to a structural inner panel member 102 of the door 14. A seal and garnishment strip at the upper edge of the door opening is shown at 104.

A load-bearing roller 106 is rotatably journalled on carrier 96. It engages the lower loadbearing surface 108 of the track 18", thereby providing support for the door as the door is moved in the fore-and-aft direction along the track 18".

Figure 29:
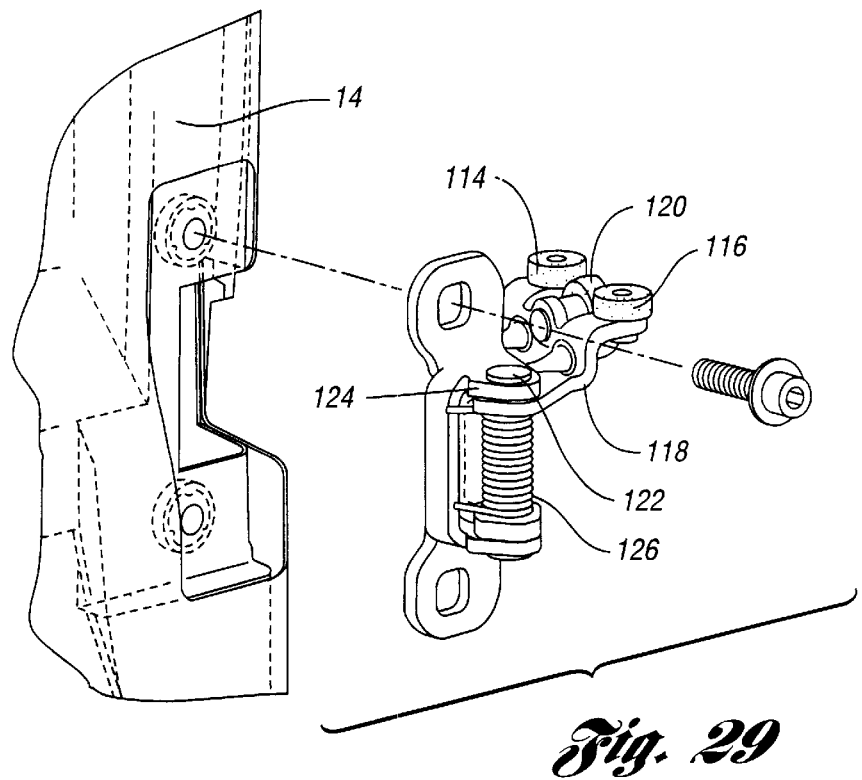
FIG. 29 is an isometric detailed view of the guide rollers and the load support rollers for the center track for supporting the alternate embodiment of the sliding door.

Like the upper track 18, the center track 33, best seen in FIG. 31, has inner walls that are engaged by guide rollers. These are best seen in FIG. 29 at 114 and 116. The rollers seen in FIG. 29 are journalled on a carrier 118 for rotation about their respective vertical axes. They correspond to rollers 32 in the embodiment schematically shown in FIG. 20. The carrier 118 also rotatably supports a load-bearing roller 120, which is mounted on the carrier 118 for rotation about a horizontal axis.

Carrier 118 is secured by a pin 122 to the eyelets of a support bracket 124, which can be bolted or otherwise secured to a structural body member at the forward margin of the opening for door 14. The rollers 114, 116 and 120 of FIG. 29 are designed for the right-hand side of the vehicle. Fasteners 101 and 112 secure track 33 to a rear vehicle body panel and to the vertical edge of the sliding door opening as shown in FIG. 31.

A torsion spring 126 surrounds a pin 122. It applies a torque to the carrier 118, which tends to hold the guide rollers 114 and 116 securely against one side of the center track 33.

Figure 30:
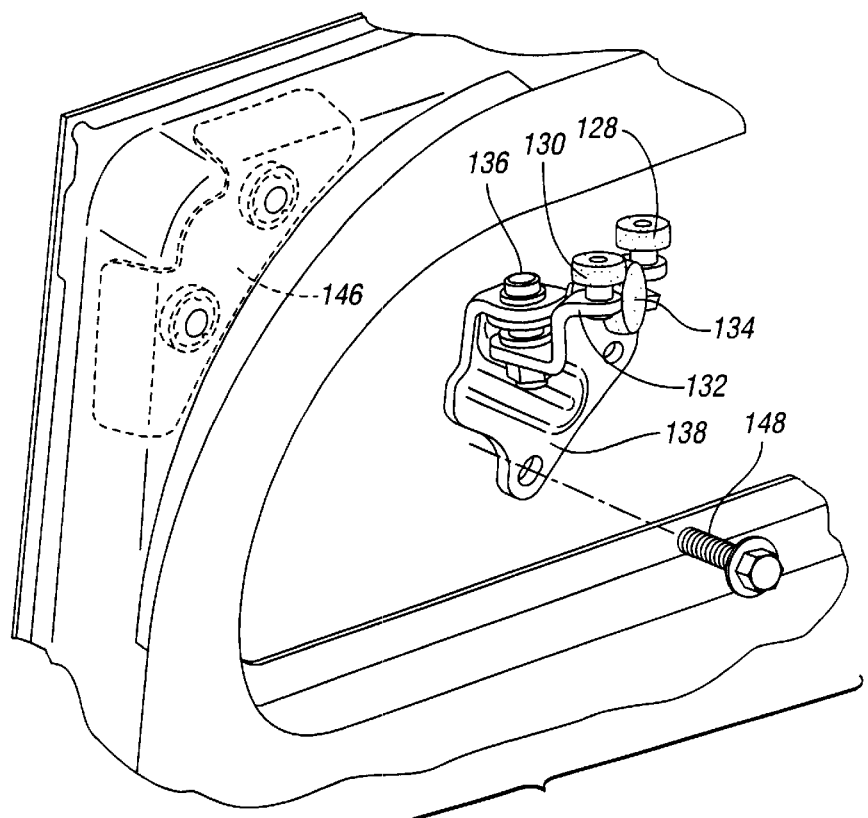
FIG. 30 is an isometric assembly view of the guide rollers and the load-supporting rollers for the upper track for the alternate embodiment of the sliding door.

FIG. 30 shows another alternate design for the guide roller and load-bearing roller assembly for the upper track 18. As in the case of the center roller assembly seen in FIG. 29, the roller assembly of FIG. 30 for the upper track 18 comprises a pair of guide rollers 128 and 130 rotatably supported about their respective vertical axes on a roller carrier 132. The carrier 132 also rotatably supports a load-bearing roller 134 for rotation about a horizontal axis. Rollers 128, 130 and 134 correspond to the rollers 26 in the design of FIG. 10.

The carrier 132 of FIG. 30 is pivotally connected by a pivot 136 to a mounting bracket 138 so that the carrier 132 can oscillate about a vertical axis. The bracket 138 is secured to a structural wall bracket 146 near the upper margin of the door 14, bolts 148 being provided for this purpose.

The track 35 at the lower margin of the door opening is shown in plan view in FIG. 28. As in the case of the roller assemblies for the upper track and the center track, the roller assembly for the lower track comprises a pair of rollers 150 and 152, which are journalled on the carrier 154. The rollers 150 and 152 are guide rollers. Unlike the roller assembly for the upper track and the center track, the roller assembly for the lower track does not include a load-bearing roller.

The carrier 154 is pivotally joined to a mounting bracket 156 by a pivot pin 158. Carrier 154 may pivot about a vertical axis on the bracket 156.

The bracket 156 of FIG. 28 corresponds to the support arm 39' of the embodiment of FIG. 5. The following description of FIG. 28 applies as well to the support arm 39' of FIG. 5.

The bracket 156 of FIG. 28 has a spring anchor 160, and the carrier 154 has a spring anchor 161. A spring 163 extends between the anchors 160 and 161 to provide a normal counterclockwise torque on the carrier 154, as viewed in FIG. 28. This maintains the rollers in contact with the inner wall of the track 35. The track 35 is secured to the lower sill portion of the door opening as described with reference to FIG. 26.

In the position of the support bracket shown in FIG. 28, the rollers 150 and 152 are at the extreme end of the lower track 35, which corresponds to a fully opened door position. The outer end of the support bracket is secured to an outer element 162 of a slider member 164, which is telescopically arranged with respect to an outer slider member 166 seen in FIGS. 28a and 28b. Element 162 supports one end of a leaf spring 168, the extended end of which carries a detent roller 170. In the position shown in FIG. 28a, the detent roller 170 is received in a detent recess 172 formed in the outer slider member 166. A second detent recess 174 also is formed in the outer slider member 166 at a calibrated distance from the recess 172.

The outer slider member 166 is secured to the base of the door. When the rollers 152 reach the end of the track 35, as seen in FIG. 28a, the door is in an intermediate position between the fully closed position and the fully opened position.

When the slider members 164 and 166 are in the relative positions shown in FIG. 28, a position sensor lever 176 is engaged by the end of the slider member 166. This causes the sensor lever 176 to pivot about its pivot pin 178. The sensor lever 176 is pinned, as shown in FIG. 28, to the bracket 156.

An actuator rod 180 is connected at one end to the lever 176 and at the other end to a pawl 182. When the lever 176 is in the position shown in FIG. 28, the pawl 182 is moved in a counterclockwise direction, thereby unlocking engageable interlock elements 184 and 186 formed, respectively, on the pawl 182 and on the interlock ratchet.

If the operator of the sliding door exerts a force on the door in a rearward direction, the detent leaf spring 168 will move from the detent recess 174 to the detent recess 172, which corresponds to the full open position. At that time, the motion slider sensor lever 176 will pivot in a counterclockwise direction, as viewed in FIG. 28a, under the force of a coil spring 188, seen in FIG. 28a. This causes the rod 180 to move the pawl 182 into locking engagement with the ratchet interlock element 186. When the pawl and ratchet are engaged, the door will be prevented from sliding toward a closed position under the force of gravity if the vehicle should be parked on a downslope.

FIG. 28c shows the overall curvature of the lower track 35 secured to the vehicle body. At the right-hand end of the track 35 is a striker 190 connected to the vehicle body, which engages the ratchet when the door reaches the intermediate open position. As the striker engages the ratchet, it pivots the ratchet in a counterclockwise direction so that the pawl 182 will be locked to the ratchet, thereby preventing the door from moving under gravity force toward the closed position.

FIG. 28b shows in schematic form the relationship between the slider members 166 and 164. As indicated in FIG. 28b, slider ball bearings 192 are located between the inner surface of the slider member 166 and the outer surface of the inner slider member 164. This reduces frictional resistance to movement of the sliding door between the closed and open positions. The ball bearings 192 are situated at multiple locations along the linear axis of the relatively movable slider members. Each ball bearing is located in a bearing element 193 having a pocket in which the ball bearings may rotate to accommodate relative sliding motion of the slider members.

Figure 32A:
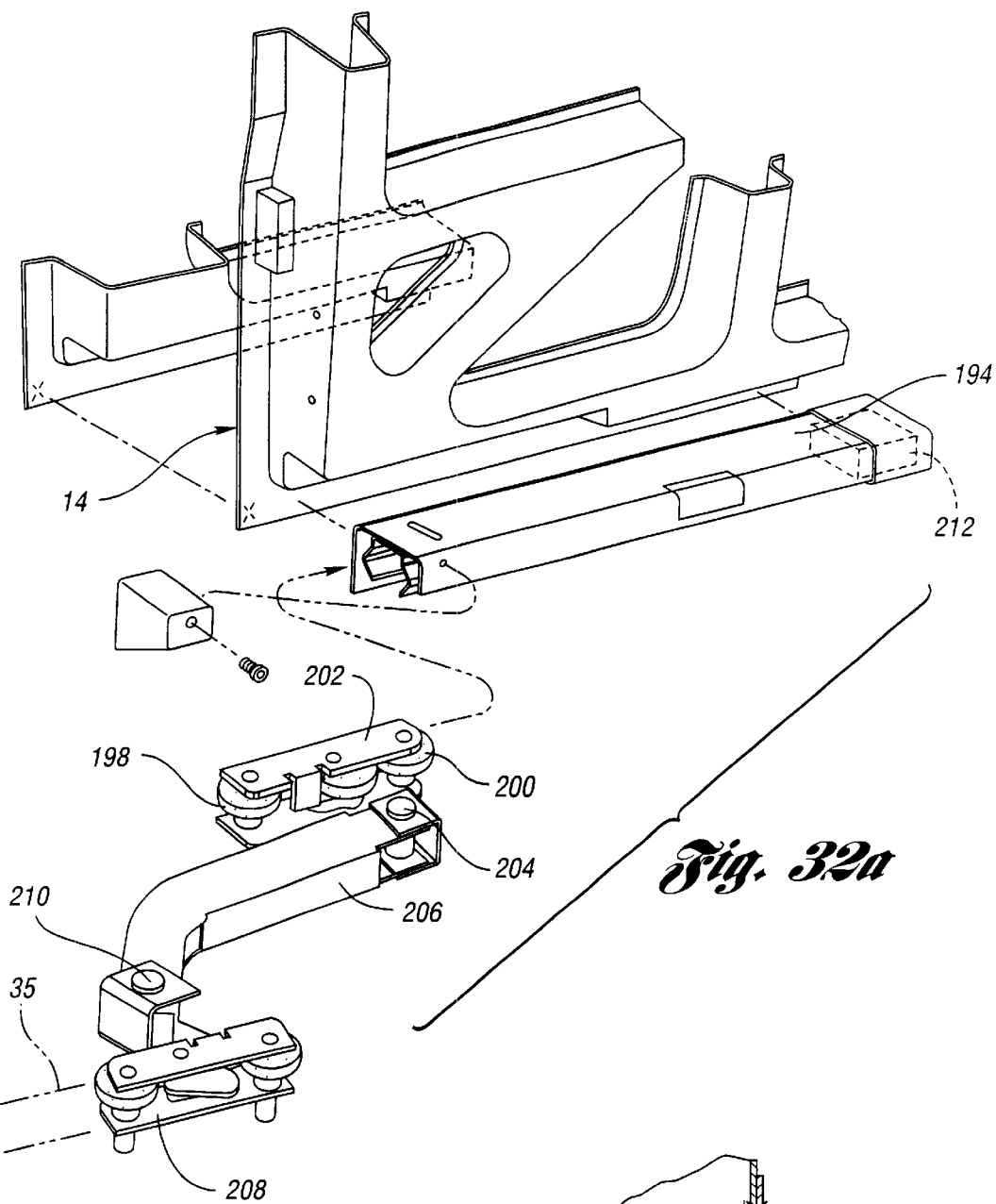
FIG. 32a shows an exploded view of a lower track assembly for still another alternate embodiment of the sliding door.
Figure 32B:
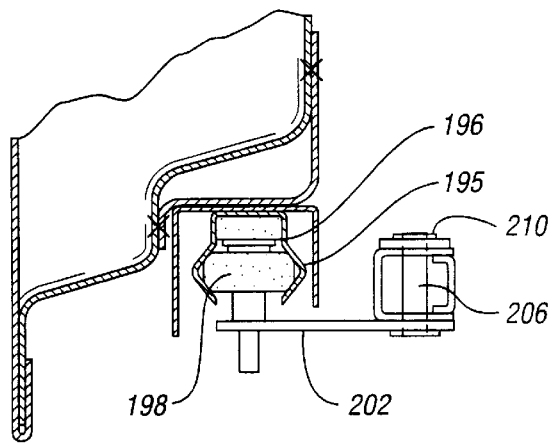
FIG. 32b is a cross-sectional view showing the lower track assembly.

FIGS. 32b–32c show schematically an exploded assembly view of still another alternate lower track and guide roller assembly. FIGS. 32a and 32b show a track assembly comprising a track housing 194 in which roller track 196 is secured. A pair of guide rollers 198 and 200, seen in FIG. 32a, is received in the track 196. The walls of the track 196 are angled, as indicated in FIG. 32b at 195, to retain the rollers 198 and 200 while they are moving in the direction of the axis of the track. The rollers 198 and 200 are rotatably journalled on a carrier 202 for rotation about vertical axes. The carrier is pinned as shown at 204 in FIG. 32a so that it can pivot about its vertical axis to accommodate movement of the rollers along the track 196.

The housing 194 is secured to the underside of the structural panels of the sliding door. The carrier 202 is pinned at 204 to arm 206. The extended end of the arm 206 carries a guide roller carrier 208, which corresponds to the carrier 154 previously described with reference to FIG. 28. The carrier 208 is pinned to the extended end of arm 206, as shown at 210.

By preference, a rubber bumper 212 is located at the end of the housing 194 of FIG. 32a to soften the engagement of the carrier 202 with the housing when the door is opened to the intermediate position.

Although preferred embodiments have been disclosed, modifications to the embodiments may be made by persons skilled in the art without departing from the scope of the invention. All such modifications and equivalents thereof are included within the scope of the following claims.

What is claimed is:

1. An automotive vehicle comprising a vehicle body with a fore-and-aft geometric axis having a side door opening;
    a slidable door having a closed position within the door opening and an open position extending outside the vehicle body out of registry with said door opening;
    upper and lower tracks fixed to the vehicle body and having a major portion thereof extending in the direction of the fore-and-aft axis along the upper and lower margins of the door opening; and
    upper and lower door guidance structures extending from said door into said tracks;
    said lower door guidance structure comprising a linear guide carried by the door, a slide assembly slidably positioned on said guide for movement along the door, an elongated arm connected to said slide assembly, and anti-friction members connected to said arm within the lower track, said door guidance structure being constructed so that when the door is moving to its open position, said slide assembly slides along the associated linear guide, whereby the door has opening movement extending to a fully opened position located beyond the linear extent of the lower track.

2. The vehicle set forth in claim 1 including spring means for biasing said slide means along said guide to normally oppose movement of the door to the fully open position.

3. The vehicle set forth in claim 1 wherein said door is a contoured door having an upper edge that is longer than the lower edge, whereby the lower track is shorter than the upper track.

4. The vehicle set forth in claim 1 wherein said door has a contoured rear edge, whereby the lower track is appreciably shorter than the upper track; and
    a spring means located within said linear guide for normally maintaining said slide means at the rear end of said linear guide.

5. An automotive vehicle comprising a vehicle body with a fore-and-aft geometric axis having a side door opening, a slidable door having a closed position within the door opening, a mechanism for controlling the motion of the slidable door comprising a track structure fixed to the vehicle body and having a major portion thereof extending in the direction of the fore-and-aft axis located at a lower margin of the door opening, a door guidance structure for stabilizing the door while the door is moving between a closed position within the door opening and an open position spaced laterally from the door opening;

said door guidance structure comprising a linear guide carried by the door, a slide member slidably positioned on said guide for horizontal movement along a lower margin of the door, an arm connected to said slide member and extended through the door opening, and anti-friction members connected to said arm for disposition within said track structure;

said slide member being slidable on said linear guide when the door reaches an intermediate position corresponding to the linear extent of said track structure, whereby the door can be moved farther to a fully opened position out of registry with the door opening.

6. The mechanism of claim 5 including spring means biasing said slide member along said guide to normally oppose movement of the door to the fully opened position.

7. The mechanism of claim 5 wherein the slidable door is a contoured door having an upper edge that is longer than the lower edge;

said door guidance structure being located at the lower edge of said door.

8. An automotive vehicle comprising a vehicle body with a fore-and-aft geometric axis having a side door opening;

a slidable door having a closed position with the door opening and an open position extending outside the vehicle body out of registry with said door opening;

said slidable door having a contoured rear edge so that the door upper edge is appreciably longer than the door lower edge;

a relatively long upper track for supporting the door during door movement;

means for stabilizing the lower edge of the door during door movement;

said stabilizing means comprising a lower track fixed to the vehicle body and having a major portion thereof extending in the direction of the fore-and-aft axis, a linear guide on the lower edge of the door, an anti-friction member movable along the lower track, and a guide arm having a pivotal connection with the anti-friction member;

said guide arm having a slidable connection with said linear guide, whereby the door can move in the opening direction a distance greater than the linear extent of the lower track.

9. The vehicle set forth in claim 8 comprising spring means within said linear guide for biasing said guide arm toward the contoured rear edge of the door.

10. The vehicle set forth in claim 8 wherein said guide arm extends underneath said linear guide, said slidable connection comprising plural rollers unsupported on said guide arm within said linear guide.

11. The vehicle set forth in claim 8 wherein said guide arm comprising an elongated rod extending longitudinally within the linear guide;

said slidable connection comprising a slide element carried by said rod within the linear guide.

12. The vehicle set forth in claim 11 comprising a coil spring within said linear guide for biasing said slide element toward the contoured rear edge of the door.

13. The vehicle set forth in claim 8 comprising spring means within said linear guide for exerting a biasing force on said door and said slidable connection whereby said slidable connection is normally located near the door rear edge;

an upper door support carriage movable along the upper track; and frictional resistance means carried by said upper carriage for accommodating vertical gravity loads and for guiding the upper carriage in the upper track.

14. A sliding side door assembly for a wheeled vehicle, the vehicle having a fore-and-aft geometric axis including a side door opening with an upper edge, a lower edge that is shorter than the upper edge, a forward edge and a rearward edge that is contoured at the lower portion of the door opening whereby the lower portion of the door opening is narrower than the upper portion of the door opening;

an upper track fixed to the vehicle at the upper edge of the door opening;

a lower track fixed to the vehicle at the lower edge of the door opening;

the upper and lower tracks having major portions extending in the direction of the fore-and-aft axis;

each track having a curved portion extending toward an interior of the vehicle through the door opening;

a first roller carriage connected to the door assembly at an upper margin of the door assembly whereby the door assembly is supported and guided in the upper track;

a second roller carriage connected to a guide arm for the door assembly whereby the door assembly is guided in the lower track;

a lower guide connected to the lower margin of the door assembly;

anti-friction guide elements connected to the guide arm, said anti-friction guide elements being slidably disposed on the linear guide whereby the door assembly is movable relative to the vehicle to a position beyond the rearward edge of the door opening to effect access to the interior of the vehicle through the entire door opening.

15. The sliding door assembly set forth in claim 14 wherein the roller carriages are movable through the curved portions of the tracks as the door assembly is moved forwardly thereby positioning the door assembly into registry with the door opening when the door opening is closed.

16. The sliding door assembly set forth in claim 14 wherein the guide arm extends through the door opening when the door assembly is moved rearwardly thereby accommodating movement of the door assembly rearward of the rearward edge of the door opening.

17. The sliding door assembly set forth in claim 14 wherein the linear guide comprises a first slide member secured to the lower margin of the door assembly and a second slide member secured to the guide arm; and bearing means disposed between the first and second slide members to accommodate relative sliding movement of the slide members.

18. The sliding door assembly set forth in claim 17 comprising detent means including detent elements carried by the slide members for establishing a detent lock at relative positions of the slide members corresponding to a fully open position of the door assembly and to an intermediate portion for the door assembly at which the second roller carriage is positioned at the rearward end of the lower track.

19. The sliding door assembly of claim 18 including latch means comprising releasable inter-locking elements carried by the guide arm and the door assembly at the lower margin thereof for locking the door assembly against movement toward a close position under the force of gravity.

20. A fully-openable sliding door assembly for an automotive vehicle body having a body side opening, the vehicle body having a fore-and-aft geometric axis, the side opening having an upper margin near a roof structure of the vehicle body and a lower margin near a sill portion of the vehicle body;

the length of the upper margin being longer than the length of the lower margin whereby a rear wheel well in the body side is accommodated;

a first door support member in the sliding door assembly located at the upper margin for supporting the weight of the sliding door assembly;

a second door support member on the sliding door assembly at a location intermediate the upper margin and the sill portion for supporting the weight of the sliding door assembly;

said first and second door support members having anti-friction elements, the upper margin and the intermediate location of the body side opening having first and second tracks, respectively, receiving the anti-friction elements of the door support members whereby the door is movable from a position in which the body side opening is fully closed by the sliding door assembly to a position in which the body side opening is fully open;

a guide structure carried by the sliding door assembly at the lower margin of the door opening, the guide structure comprising a guide track secured to the vehicle body and extending in the direction of the fore-and aft axis, guide rollers in the guide track for accommodating sliding movement of the door assembly from a forward position to a first rearward position relative to the fore-and-aft axis, and means for guiding and moving the sliding door assembly to a second rearward position corresponding to a fully open position of the door assembly; and a frontmost margin of the sliding door assembly being located at the rearmost margin of the door opening when the sliding door assembly is fully open whereby a maximum degree of access through the door opening is available.

* * * * *